(12) United States Patent
Matsuno

(10) Patent No.: US 8,208,728 B2
(45) Date of Patent: *Jun. 26, 2012

(54) METHOD OF GENERATING A LABELED IMAGE AND IMAGE PROCESSING SYSTEM WITH PIXEL BLOCKS

(75) Inventor: Noriyasu Matsuno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/049,544

(22) Filed: Mar. 16, 2011

(65) Prior Publication Data

US 2011/0164818 A1    Jul. 7, 2011

Related U.S. Application Data

(62) Division of application No. 10/590,778, filed as application No. PCT/JP2005/015163 on Aug. 19, 2005, now Pat. No. 7,974,471.

(30) Foreign Application Priority Data

Aug. 20, 2004    (JP) ................................ 2004-240281

(51) Int. Cl.
*G06K 9/34* (2006.01)

(52) U.S. Cl. ...................... 382/180; 382/162; 715/203

(58) Field of Classification Search .................. 382/162, 382/180; 715/203
See application file for complete search history.

(56) References Cited

U.S. PATENT DOCUMENTS

| | | | |
|---|---|---|---|
| 4,991,224 A * | 2/1991 | Takahashi et al. | 382/180 |
| 5,384,904 A | 1/1995 | Sprague et al. | |
| 5,602,940 A | 2/1997 | Inoue et al. | |
| 6,643,400 B1 | 11/2003 | Murakawa et al. | |
| 6,731,801 B2 * | 5/2004 | Murakawa et al. | 382/180 |
| 7,477,775 B2 * | 1/2009 | Oba et al. | 382/154 |
| 2002/0175887 A1 * | 11/2002 | Yamazaki | 345/87 |
| 2003/0110444 A1 * | 6/2003 | Sakagami et al. | 715/503 |
| 2003/0156757 A1 * | 8/2003 | Murakawa et al. | 382/195 |

FOREIGN PATENT DOCUMENTS

JP    61-224672    10/1986

(Continued)

OTHER PUBLICATIONS

International Search Report for PCT/JP2005/015163 dated Dec. 6, 2005.

(Continued)

*Primary Examiner* — Chan S Park
*Assistant Examiner* — Eueng-Nan Yeh
(74) *Attorney, Agent, or Firm* — Marshall, Gerstein & Borun LLP

(57) ABSTRACT

To identify pixels constituting image elements for generating a labeled image in which pixels are labeled with identification information, a pixel block including four pixels adjacent to one another in two dimensions is inputted as a unit from data including pixels that form an image. All of the on-pixels that are subject for grouping, included in the pixel block are labeled with the same identifier. Since the on-pixels that are included in a pixel block are consecutively connected, such pixels can be labeled with the same identifier without having to calculate whether such pixels are connected.

12 Claims, 13 Drawing Sheets

FOREIGN PATENT DOCUMENTS

| | | |
|---|---|---|
| JP | 03-222074 | 10/1991 |
| JP | 04-199379 A | 7/1992 |
| JP | 06-342470 A | 12/1994 |
| JP | 07-105368 | 4/1995 |
| JP | 07-192130 | 7/1995 |
| JP | 09-050527 | 2/1997 |
| JP | 2000285237 A | 10/2000 |
| JP | 2002-230540 | 8/2002 |

OTHER PUBLICATIONS

Written Opinion for PCT/JP2005/015163 dated Dec. 6, 2005.

* cited by examiner

METHOD OF GENERATING A LABELED IMAGE AND IMAGE PROCESSING SYSTEM WITH PIXEL BLOCKS

CROSS-REFERENCE TO RELATED APPLICATIONS

This application is a division of U.S. application Ser. No. 10/590,778 filed Jun. 19, 2007. The entire text of the priority application is incorporated herein by reference in its entirety.

TECHNICAL FIELD

The present invention relates to a method of labeling used for extracting image elements and other purposes.

BACKGROUND ART

A labeling process that assigns labels to pixels of connected components is known as a basic method for processing two-dimensional images. Japanese Laid-Open Patent Publication No. H07-192130 discloses a provisional labeling process of a labeling process that is carried out using a one-dimensional SIMD (Single Instruction stream Multiple Data stream) processor. In the disclosed technique, a process of provisional labeling is carried out on each row in an image in order using the one-dimensional SIMD processor.

Japanese Laid-Open Patent Publication No. 2002-230540 discloses a labeling process carried out in parallel for pixels in a diagonal direction in a pixel array in an input image by a plurality of PEs (processing elements) in a one-dimensional SIMD processor. By processing a plurality of pixels in the diagonal direction in parallel, labeling can be carried out for the pixels that are adjacent of a target pixel and would be connecting to the target pixel before labeling the target pixel. By doing so, effective use is made of the parallel processing ability of the SIMD processor and therefore the processing speed is increased. To realize this method however, even for an image with a resolution of around 200 dpi, a one-dimensional SIMD processor with several thousand PEs are required to scan in the diagonal direction.

DISCLOSURE OF THE INVENTION

One aspect of the present invention is a method of generating a labeled 30 image, including the steps of:
a1. inputting a pixel block, which includes a plurality of pixels that are adjacent to one another in more than one dimension, as a single unit from data including pixels for forming an image; and
a2. labeling, based on binarized pixels, all on-pixels or all off-pixels that subject for grouping and are included in the pixel block with common identification information.

If the image is a two-dimensional image, the pixel block is composed of 2×2=4 pixels that are adjacent to one another in two dimensions. Conversely, if the image is a three-dimensional image, the pixel block is composed of 2×2×2=8 pixels that are adjacent to one another in three dimensions. Each pixel included in a pixel block is adjacent to all of the other pixels included in the pixel block. When grouping or segmenting pixels composing an image is performed, based on a binarized image, by labeling pixels that are connected in eight directions with the same or common identification information, among the pixels included in a pixel block, all the pixels that are subjects for grouping, that is, all the pixels with the same state or value (i.e., all on-pixels that are ON ("1") or all off-pixels that are OFF ("0")) in the pixel block can be labeled with the common identification information. Accordingly, a process that assigns identification information to individual pixels for grouping included in the pixel block is not required, and parallel processing with the plurality of pixels included in a pixel block becomes possible. It is therefore possible to improve the speed of the process that includes generating a labeled image in which the pixels have been labeled with identification information.

One of other aspects of the present invention is an image processing system including:
b1: an interface configured for inputting data including a plurality of pixels, which are adjacent in more than one dimension and compose a pixel block, in parallel from data including pixels for forming an image; and
b2. a labeling processor configured for labeling, based on binarized pixels, all on-pixels or all off-pixels that are subject for grouping and are included in the pixel block with common identification in parallel.

In the image processing system, a plurality of pixels that compose a pixel block are input in parallel and the plurality of pixels are labeled with the common identification information in parallel. The image processing system preferably includes a processor equipped with a processing region that includes a plurality of processing elements and, in the processing region, a plurality of data paths that operate in parallel are configured by the plurality of the processing elements. The interface and the labeling processor can be configured in the processing region of the processor and it is possible to provide the processor that can execute the process that inputs a plurality of pixels and the process that labels the plurality of pixels by pipeline processing.

Further one of other aspects of the present invention is an image processing method, including the steps of:
c1. inputting a pixel block, which includes a plurality of pixels that are adjacent to one another in more than one dimension, as a single unit from data including a plurality of pixels for forming an image;
c2. labeling, based on binarized pixels, all on-pixels or all off-pixels for grouping that are included in the pixel block, with same identification information; and
c3. distinguishing image elements in a labeled image.

Distinguishing image elements leads identifying the image elements, extracting the image elements, and calculating characteristic values of the image elements. The characteristic values (characteristic amounts) include a one-dimensional or two-dimensional moment, an area, a boundary length, a density, a width, and other values of the image element. If the image is a three-dimensional, the characteristic values of the image elements include a volume (cubic content), a center of gravity, a moment, and other values. Identifying the image elements and finding the characteristic values thereof are effective for many applications that include a process where it is necessary to recognize an image. Using a labeled image, an industrial robot that carries out automatic mounting can judge the position and tilting of a component that has been attached. In an automatic driving apparatus, a labeled image is used to recognize the road or obstacles. In a three-dimensional CT scan, the labeled image is used in a process for having basic characteristics of a body of an image, or preprocessing for the same.

The process for generating a labeled image preferably include a first stage and a second stage; the first stage including scanning an image, labeling with provisional identification information showing the relationship with pixels in the vicinity, and generating connecting (linking or combining) information for the provisional identification information; and the second stage including labeling with real identification information showing image elements based on the provisional identification information and the connecting information thereof. The step of inputting and the step of labeling described above can be applied to the first stage and the second stage respectively, and the processing speed of the respective stages can be improved.

The image processing system is provided that includes a first processing system and a second processing system; the first processing system being for scanning the image, labeling with the provisional identification information, and generating connecting information for the identification information; and the second processing system being for labeling with real identification information showing image elements based on the connecting information. The first processing system and the second processing system respectively include the interface and the labeling processor, wherein the labeling processor of the first processing system assigns the provisional identification information as the common identification information for labeling, and the labeling processor of the second processing system assigns the real identification information as the common identification information for labeling. The image processing system preferably includes a reconfigurable processor equipped with a processing region and a control unit for reconfiguring the processing region. The interface and the labeling processor included in the first processing system and the interface and the labeling processor included in the second processing system can be configured in the processing region after the processing of the respective processing system has ended. By configuring the first processing system and the second processing system at different timing in the processing region, it is possible to make effective use of the hardware resources of the processor and to provide a small-scale image processing system with high performance.

A reconfigurable integrated circuit device such as an FPGA equipped with a plurality of processing units is one of hardware that includes a function for performing many processes in parallel. The reconfigurable integrated circuit device disclosed by WO02/095946 filed by the present applicant is suited to the above image processing system since the circuit configuration can be dynamically changed.

In the first stage and the first processing system, at the labeling with the provisional identification information, pixel blocks are units for labeling with the provisional identification information. Accordingly, the provisional identification information for labeling is selected not for (unit of) individual pixel but for (unit of) pixel block units. In the first stage and the first processing system, at the labeling with the provisional identification information, a pixel block is inputted together with an adjacent pixel group including pixels that have already been labeled with the provisional identification information. The following steps are carried out in pixel block units for labeling with provisional identification information:

d1. inheriting, when the adjacent pixel group includes inheritable provisional identification information, the inheritable provisional identification information as the common identification information;
d2. recording, when the adjacent pixel group includes other inheritable provisional identification information, connecting information for the inherited provisional identification information and non-inherited provisional identification information; and
d3. setting, when the adjacent pixel group does not include inheritable provisional identification information, new provisional identification information as the common identification information.

The processor for labeling with the provisional identification information can be configured for pipeline processing a process that decodes the pixel block and the adjacent pixel group; and a process that labels the pixels for grouping in the pixel block with selected one of the inheritable provisional identification information and the new provisional identification information as the common identification information. The second stage that is executed after the first stage and labels with real identification information as the common identification information includes the step of inputting and the step of labeling that are independent of the first stage, wherein in the step of labeling, based on the connecting information, the real identification information that is common to pixel blocks in a connecting relationship is assigned as the common identification information for labeling.

One of the labeled images has the identification information for segmenting image elements in which pixels are consecutive or connected. For generating such labeled image, in the first stage and the first processing system, a pixel block composed of four pixels adjacent to one another in two dimensions and an adjacent pixel group composed of six pixels that are adjacent to two adjacent edges of the pixel block are inputted, and when both the pixel block and the adjacent pixel group include pixels that compose an image element in which the pixels are consecutive, the provisional identification information included in the adjacent pixel group is inherited. It is also possible to input a plurality of pixel blocks and adjacent pixel group related to the pixel blocks and to label pixels included therein that compose connected image elements with the common provisional identification information.

In the method where all of the pixels for grouping included in a pixel block are labeled with the common identification information, it is not judged whether the pixels for grouping included in the pixel block are consecutively connected. When the range labeled with the common identification information is a pixel block that includes only 2×2 pixels, the pixels connected in eight directions are identified by the common identification information. By increasing the number of pixels included in one pixel block and/or labeling the pixel blocks having some relationship with the common identification information, it is possible to label pixels that are not necessarily consecutively connected, with the common identification information. According to this type of labeling, it is possible to roughly group pixels included in high-resolution pixel data. That is, pixels that are not connected can be grouped together according to predetermined conditions. In addition, since it is possible to collectively assign the same identification information to pixels included in a pixel block using parallel processing, the processing speed of the labeling process is improved. Since no process that changes the image resolution is included in the labeling procedure according to the present method, it is possible to assign identification information that has been roughly grouped to high-resolution image data without deterioration in the precision of the image data.

In the first stage and the first processing system, when at least one pixel block and an adjacent pixel group including at least one pixel block that is adjacent to the at least one pixel block are inputted, and when both the at least one pixel block and the adjacent pixel group include pixels for grouping, provisional identification information included in the adjacent pixel group is inherited. So long as pixels are present in a range in which pixel blocks are interrelated, provisional identification information is inherited even if the pixels are not consecutive or connected. Accordingly, it is possible to assign the common identification information to pixels that have some range of relationship exceeding a range where the pixels are connected.

In the first stage and the first processing system, when a large pixel block composed of four pixel blocks that are adjacent to one another in two dimensions and an adjacent pixel group composed of six pixel groups that are adjacent to two adjacent edges of the large pixel block are inputted, and when both the large pixel block and the adjacent pixel group include pixels for grouping, provisional identification information included in the adjacent pixel group can be inherited. The large pixel block including four pixel blocks is composed of sixteen pixels. Accordingly, it is possible to assign the common identification information to pixels in a range in which four pixel blocks and six pixel blocks that are adjacent to the four pixel blocks are related, thereby grouping such pixels together. With this type of labeling, sixteen pixels can be labeled in parallel, and to do so, forty pixels included in a large pixel block and the adjacent pixel group, are processed in parallel. This method is suited to implementation in hardware (a processor) with a large number of processing elements that operate in parallel. Although the logic relating to inheritance will become complex, it is also possible to input a plurality of large pixel blocks and adjacent pixel group related thereto and to label the pixels in parallel.

In the second stage and the second processing system for labeling with real identification information, it is also possible to set, based on the connecting information, real identification information that is common to large pixel blocks in a connecting relationship as the common identification information and to label all of the pixels for grouping included in the large pixel block with the real identification information. In this stage of relabeling where some of the provisional identification information is combined, sixteen or more pixels can be labeled with the real identification information in parallel.

Further on of other aspects of the present invention is a method of analyzing an image, including the steps of:

e1. inputting a pixel block, which includes a limited number of pixels that are adjacent to one another in more than one dimension, as a single unit from data including pixels for forming an image;

e2. labeling, based on binarized pixels, all on-pixels or all off-pixels that are subject for grouping, included in the pixel block with common identification information; and e3. calculating characteristic values of respective image elements by repeatedly carrying out an operation in units that include at least one pixel block.

In the step of labeling, the same or common identification information is collectively assigned to the pixels included in one pixel block as a unit. Since the image elements are assembled with pixel blocks, by repeating an operation in units that include pixel blocks, it is possible to calculate characteristic values of the respective image elements. The image processing system also preferably includes a first processor configured to calculate characteristic values of the respective image elements by repeating an operation in units that include at least one pixel block. When the image processing system includes a reconfigurable processor, the first processor can be reconfigured in the processing region at appropriate timing after the processing of the first processing system has been completed.

It is preferable for the method to further include a process that is executed in parallel with the labeling and calculates, in units of the pixel blocks under the labeling, block characteristic values that contribute to characteristic values of image elements. Finding the characteristic values of the respective pixel blocks is effective as preprocessing when finding the total of the characteristic values of the image elements grouped together using the identification information. In the process that calculates the block characteristic values, it is possible to find characteristic amounts using binarized pixels and it is also possible to calculate the block characteristic values from multivalue pixels included in the labeled pixel blocks. Accordingly, a process that finds a characteristic value from multivalue pixels including gray level information can be carried out in parallel to the labeling process and in particular the process for labeling with provisional identification information, and therefore it becomes possible to omit the processing time required to reaccess the image data including gray level information based on the labeled information.

The image processing system preferably further includes a second processor that is supplied by the interface with data including a pixel block in parallel with the labeling processor and is configured to calculate block characteristic values that contribute to characteristic values of image elements in units of the pixel blocks under the labeling. The second processor should preferably be configured to calculate values that contribute to the characteristic values of image elements from multivalue pixels included in pixel blocks under the labeling.

BRIEF DESCRIPTION OF THE DRAWINGS

FIG. 3(a) to FIG. 3(d) respectively shows the combinations of the pixel arrangements of the pixel block and the adjacent pixel group for selecting a provisional identifier.

FIG. 6(a) shows an enlargement of the arrangement of a large pixel block and an adjacent pixel group and FIG. 6(b) shows the arrangement of provisional identifiers (provisional IDs).

BEST MODE FOR CARRYING OUT THE INVENTION

1. Basic Concept of Block Labeling

Figure 1:
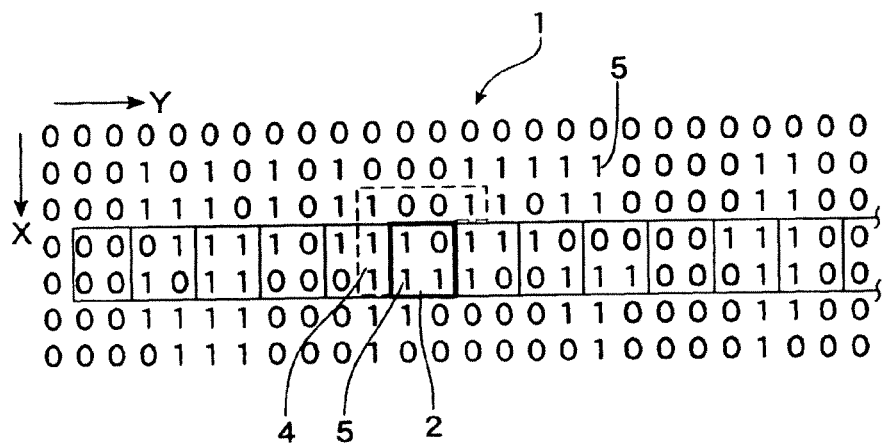
FIG. 1 shows scanning an image in units of pixel blocks.

FIG. 1 shows the basic concept of block labeling. Here, a binarized two-dimensional image (a binary image) 1 to be outputted (displayed, printed, etc.) in frame units is used as an example image. The image 1 is a two-dimensional array of a plurality of pixels 5 that each have a value of "0" (OFF) or "1" (ON). By generating a labeled image where the pixels 5 have been labeled with identification information, it is possible to analyze the information included in the image data including the pixels 5. Image elements composed of pixels 5 that are in a predetermined relationship are segmented or distinguished from the information in the image 1 so that the image 1 can be automatically analyzed or specific elements in the image 1 can be shown to the user and analyzed further.

Conventional labeling is used to segment or classify elements (areas or parts, referred to as "image elements" in the present specification) where pixels 5 are consecutively connected. Block labeling herein can be used to segment image elements where the pixels 5 are consecutive and can also be used to segment image elements from pixels 5 that are not consecutive but have a predetermined relationship. In the present specification, identifying pixels 5 that are not consecutive but have a predetermined relationship and also identifying consecutive pixels 5 are called "grouping". In particular, the identifying pixels 5 that are not consecutive but have a predetermined relationship is sometimes referred to as "rough grouping". A block labeling process makes grouping, that includes the rough grouping possible and therefore even when the pixels 5 are not consecutive, it becomes possible to judge that pixels that are in a given range or have a given distance relationship compose a single element in the image. On of the rough grouping identifies pixels that are several pixels away at most, including consecutive pixels, as belonging to the same group.

In a binary image, it is possible to treat compositions (elements) made up of on-pixels, which are pixels that are ON (i.e., that have the value "1"), as image elements, contrary it is also possible to treat compositions (elements) made up of off-pixels, which are pixels that are OFF (i.e., that have the value "0"), as image elements. In an example image described below includes image elements composed of on-pixels (value "1"). Accordingly, in an example method of block labeling described, the on-pixels having value "1" are labeled with identification information as pixels that are subjects for grouping. It is also possible to carry out the block labeling process for grouping off-pixels having value "0" using the similar method.

1.1 Identifying Image Elements where Pixels are Connected

Figure 2:
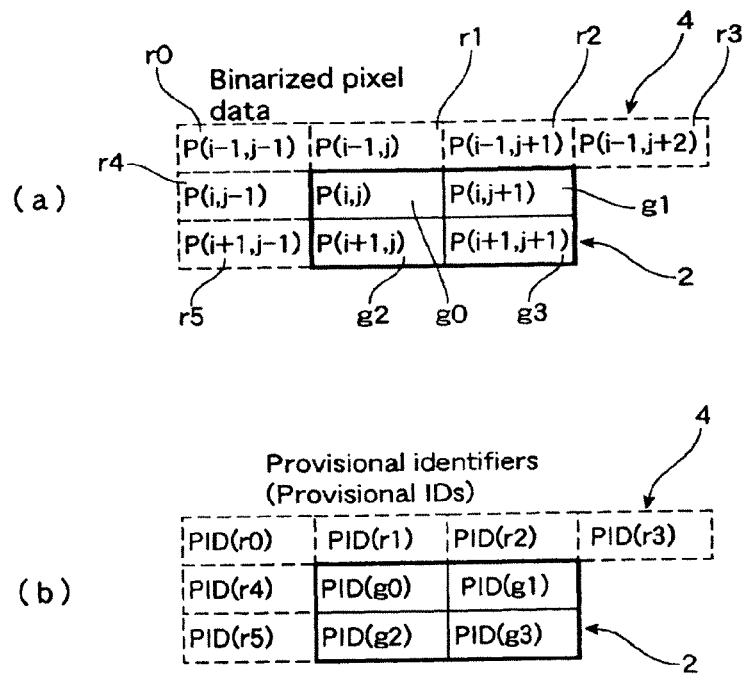
FIG. 2(a) shows an enlargement of the arrangements of a pixel block and an adjacent pixel group and FIG. 2(b) shows the arrangement of provisional identifiers (provisional IDs).

FIG. 1 and FIG. 2 show an example method of block labeling pixels that relate to image elements where pixels are connected. In a process that generates a labeled image where pixels have been labeled with identification information used to distinguish image elements, it is necessary to judge how the large number of pixels included in a single image are connected. In a two-dimensional image, an "image element" is a connected region that extends in two dimensions. A large amount of memory is required to search for image elements in two dimensions, and since there is a high probability of duplicated processing, the processing is normally inefficient. In this method, first, a search is carried out in direction of one dimension to judge whether respective pixels are connected to other pixels that have already been labeled with provisional identification information and label the respective pixels with provisional identification information. During the labeling with provisional identification information while scanning an image, when an identifier of the provisional identification information that has assigned is connected to the other identifier of the provisional identification information that has also assigned at the later stage, one of the identifiers is inherited and connecting information for the connected identifiers of the provisional identification information is generated. When the scanning of the image is complete and the connecting information is aggregated for the image, "real" identification information showing connected elements are selected using the provisional identification information and the connecting information for the provisional identification information, then a labeled image where the pixels are relabeled with real identification information is generated. From this labeled image, it is possible to distinguish independent image elements which can be used in a variety of image processing.

In the block labeling process, when labeling the pixels 5 that are arranged in two dimensions, instead of processing the pixels 5 one by one or processing in one dimension such as in row units, four pixels 5 that are adjacent above, below, left, and right are processed in parallel as a single unit (called a "pixel block"). A pixel block 2 is a 2×2 and a two-dimensional array, and the pixels 5 included in the pixel block 2 are adjacent to one another. Accordingly, if it is assumed that there are eight directions in which pixels can be connected, if a pixel block 2 includes pixels that are "1", all of the on-pixels 5 included in the pixel block 2 are connected with no need for further logic operations, and the common identification information, for example, the same identification data (an identifier) such as a label, will definitely be assigned to each pixel. This means that by carrying out labeling pixels in pixel blocks 2 as units, a 2×2 array of four pixels 5 is processed in parallel and simultaneously it is possible to omit processing for logic operations regarding the relationship between the four pixels 5.

The direction of scanning that has pixel blocks 2 as units can be any of up, down, left and right. In the present embodiment, block labeling is carried out with the left to right direction (Y direction) for the image 1 shown in FIG. 1 as the scanning direction and the top to bottom direction (X direction) as the subscanning direction. An adjacent pixel group 4 referred to when determining how the pixels 5 included in a single pixel block 2 are connected is composed of six pixels 5 that are adjacent to the upper edge and to the left edge of the pixel block 2. During block labeling, the data (referred to as "provisional identifiers", "provisional IDs", or "provisional labels") for provisionally or preliminary identifying the four pixels P included in a pixel block 2 is the same, and the four pixels P included in a pixel block 2 are labeled with the same data in parallel.

As shown in FIGS. 2(a) and 2(b), the four pieces of data ("provisional identifiers", "provisional IDs", or "provisional labels") $PID(i,j)$, $PID(i,j+1)$, $PID(i+1,j)$, and $PID(i+1,j+1)$ used to provisionally identify the four pixels $P(i,j)$, $P(i,j+1)$, $P(i+1,j)$, and $P(i+1,j+1)$ included in the pixel block 2 are the same. Accordingly, the pixels are labeled in parallel with the same identifier. The provisional identifier of the pixel block 2 is decided by referring to the respective provisional identifiers of the six pixels $P(i-1,j-1)$, $P(i-1,j)$, $P(i-1,j+1)$, $P(i-1,j+2)$, $P(i,j-1)$, and $P(i+1,j-1)$ included in the adjacent pixel group 4 that have already been labeled with provisional identifiers. This processing is repeated while scanning the entire image 1 in units of pixel blocks 2. To simplify the description below, the pixels 5 included in a pixel block 2 are referred to as the pixels g0 to g3 in the order described above and the pixels 5 included in an adjacent pixel group 4 are referred to as the pixels r0 to r5 in the order described above.

Figures 3, 4:
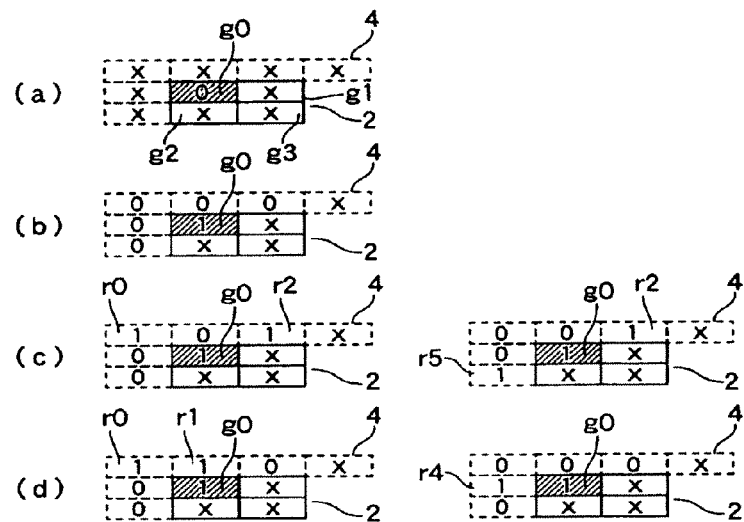
FIG. 4 is a table in which combinations of the pixel arrangement of the pixel block and the adjacent pixel group for selecting the provisional identifier are collectively shown.
Figure 7:
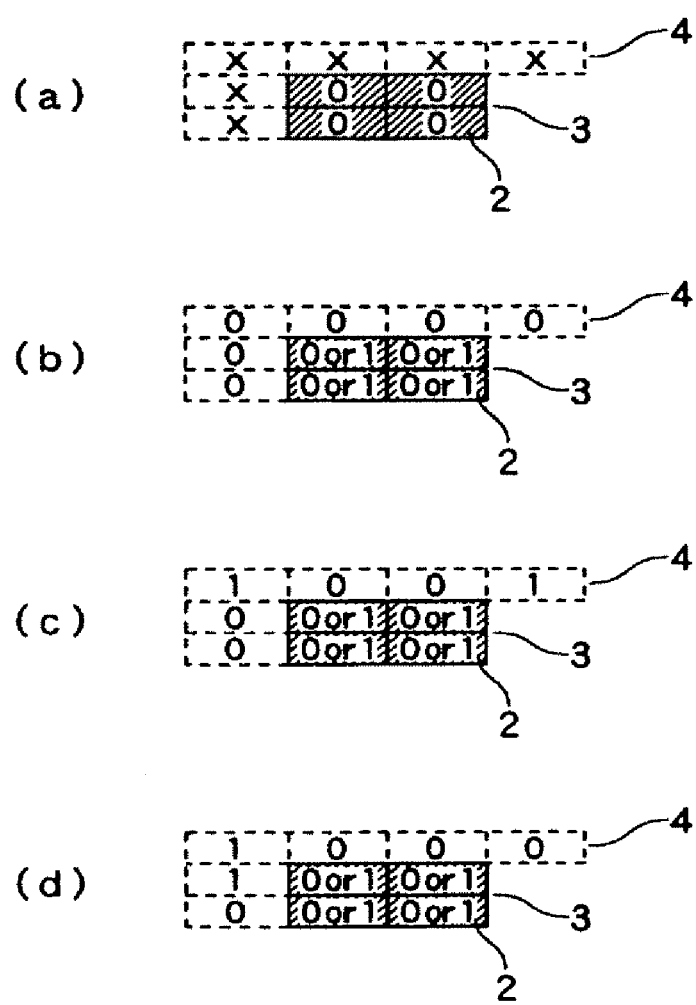
FIG. 7(a) to FIG. 7(d) respectively shows the combinations of the pixel arrangements of the large pixel block and the adjacent pixel group for selecting the provisional identifier.

FIGS. 3(a) to 3(d) show examples of where a provisional identifier included in the adjacent pixel group 4 is inherited by the pixel block 2 based on the states of the pixels in the adjacent pixel group 4 and the states of the pixels of the pixel block 2. The reference character "X" in FIGS. 3, 4 and 7 is a commonly used cross mark (X-mark). The cross marked pixels or pixel blocks values can be any of "1" or "0." Note that in FIGS. 3(a) to 3(d), examples where the provisional identifier used to label the pixels 5 of the pixel block 2 is based on only the state of the upper left pixel g0 of the pixel block 2 are shown. In FIG. 3(a), the pixel g0 of the pixel block 2 is "0", and it is not possible to decide whether to inherit a provisional identifier based on the pixel g0 of the pixel block 2 alone. If the other pixels g1 and g2 are also "0" and only the lower right pixel is "1", regardless of the state of the adjacent pixel group 4, no provisional identifier included in the adjacent pixel group 4 is inheritable and a new provisional identifier will be assigned to the pixel g3.

In FIG. 3(b), the pixel g0 of the pixel block 2 is "1" and the pixels r0 to r2, r4, and r5 of the adjacent pixel group 4 are "0". Accordingly, a provisional identifier that can be inherited by the pixel g0 is not included in the adjacent pixel group 4. However, depending on the state of the pixel r3 of the adjacent pixel group 4 and the state of the pixel g1 in the pixel block 2, there is a possibility of a provisional identifier included in the adjacent pixel group 4 being inherited by the pixel block 2. If there is no inheritable identifier, a new provisional identifier is assigned to the pixels of the pixel block 2, including the pixel g0.

In the left and right cases shown in FIG. 3(c), the pixel g0 in pixel block 2 is "1". In the left case, the pixels r0 and r2 of the adjacent pixel group 4 have been labeled with provisional identifiers. That is, the pixels r0 and r2 of the adjacent pixel group 4 on the left side are both "1" and since pixels in the adjacent pixel group 4 have already been labeled with provisional identifiers, a provisional identifier or provisional identifiers will have already been assigned to the pixels r0 and r2. In the right case, a provisional identifier or provisional identifiers have been assigned to the pixels r2 and r5 of the adjacent pixel group 4. In addition, since the on-pixels that are "1" in the adjacent pixel group 4 are not consecutive (connected), there is the possibility that these pixels will have been labeled with different provisional identifiers. In these cases, when there are a plurality of inheritable provisional identifiers for the pixel g0, one of the inheritable provisional identifiers is inherited and connecting information for the inherited inheritable provisional identifier and the one or plurality of other inheritable provisional identifiers that have not been inherited is outputted. That is, when there are a plurality of inheritable provisional identifiers, one of such inheritable identifiers is inherited as the provisional identifier and other identifier(s) is/are inherited as the connecting information. Accordingly, by referring to the provisional identifiers and the connecting information, the connected relationships of pixels become clear. Depending on the states of the other pixels of the pixel block 2 and the other pixels of the adjacent pixel group 4, the provisional labels that can be inherited by the pixel block 2 are not only limited to provisional labels related to the pixel g0.

In the left and right cases shown in FIG. 3(d), the pixel g0 of the pixel block 2 is "1". In the left case, the pixels r0 and r1 of the adjacent pixel group 4 are "1", the pixels r0 and r1 are connected and therefore the probability of both pixels r0 and r1 having the same provisional identifier is high. In the right case, the pixel r4 of the adjacent pixel group 4 is "1" and has been assigned a provisional identifier. In such cases, there is only one inheritable provisional identifier for the pixel g0, and therefore such provisional identifier is inherited. However, depending on the other pixels of the pixel block 2 and the other pixels of the adjacent pixel group 4, a plurality of inheritable provisional identifiers may be existed for the pixel block 2, and in such case, connecting information is generated.

FIG. 4 shows combinations of the pixels g0 to g3 in the pixel block 2 and corresponding combinations of the pixel arrangements of the adjacent pixel group 4 that relate to determining the provisional identifiers of the pixel block 2. The combinations #1 to #5 are the cases where one of the provisional identifiers assigned to the adjacent pixel group 4 is inherited and assigned to the pixel block 2. Such combinations of the adjacent pixel group 4 shown in FIG. 4 are judged by the logical OR results, and one of the provisional identifiers have been assigned to the pixels shown as "1" is inherited as the provisional identifier of the pixel block 2 according to the state of the pixels in the pixel block 2. For example, in the combination #1, if a provisional identifier has been assigned to any of the pixels P(r0), P(r1), P(r2), P(r4), and P(r5) of the adjacent pixel group 4 and the pixel P(g0) of the pixel block 2 is "1", one of the provisional identifiers PID(r0), PID(r1), PID(r2), PID(r4), and PID(r5) of the adjacent pixel group 4 is inherited as the provisional identifier of the pixel block 2. Out of the pixels P(g0), P(g1), P(g2), and P(g3) of the pixel block 2, the pixels with the value "1" that are subject for grouping are labeled with the provisional identifier inherited. That shows the inheritance of provisional identifiers shown in FIGS. 3(a) to 3(d).

1.2 Identifying Image Elements by Rough Grouping

The labeling described above is one of that for extracting elements respectively composed of strictly consecutively connected pixels. Identifying elements respectively composed of non-consecutively (within one or a range of few pixels) connecting pixels by rough grouping and extracting such image elements are also effective. Since pixels do not need to be strictly consecutive for the rough grouping, one of applications is that, after an image is converted to data by a scanner or the like, extracting elements that were originally consecutively connected in an image but become non-consecutive by one or a range of a few pixels during the process of converting the image to data.

Compared to the labeling for extracting elements composed of consecutive pixels, it is possible to extract image elements composed of the pixels having some relationship at high speed and without degrading the image data, and therefore such process can be used as a pre-analysis of an image to the full or real analysis where consecutive elements in the image are labeled for extracting. One of reference methods includes generating a labeled image by applying labeling process to a low resolution image converted from a high resolution image, provisionally deciding boundary positions using the labeled image, then generating another labeled image by applying labeling process to the original high resolution image on regions in the periphery of the boundaries and finally deciding the boundary positions. By doing so, it is possible to limit the region of the high resolution image in which labeling to be carried out. However, the low resolution image data is merely used to provisionally decide the boundary positions, and since such image data have low image quality, such data are useless and cannot be used to find the characteristic values of the image elements. On the other hand, when applying the rough grouping for provisionally deciding the boundary positions, processing speed becomes high without generating data of lower resolution. Since lowering the resolution of the data is not required for the rough grouping, the same image data can be used for high precision grouping and for finding the characteristic values of the image elements.

Figures 5, 6:
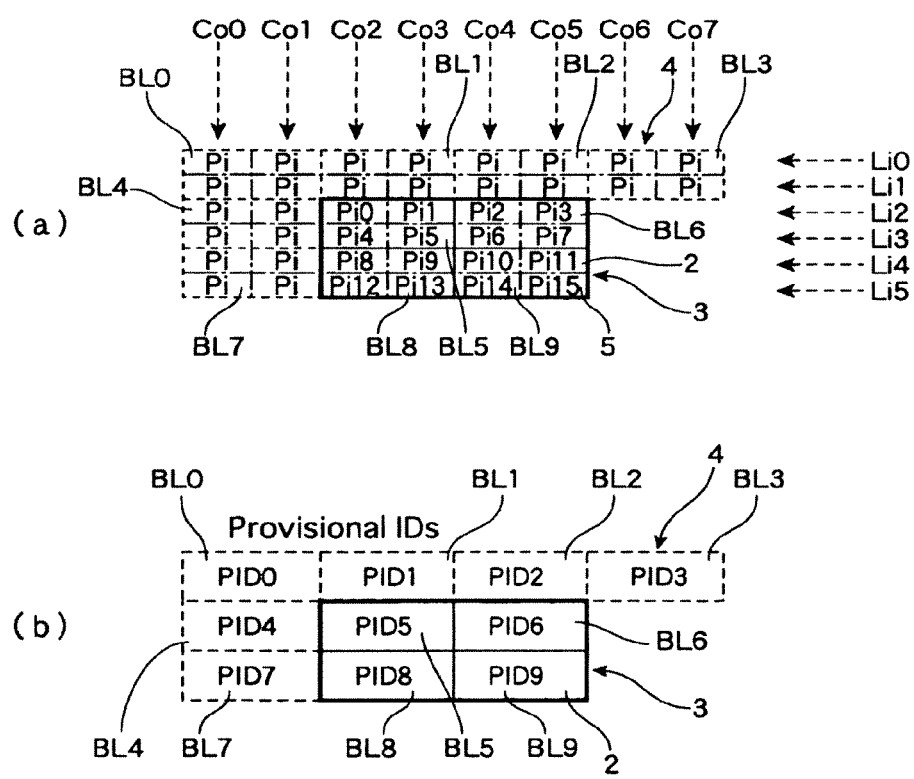
FIG. 5 shows scanning an image in units of large pixel blocks.

FIGS. 5 and 6 show an example of where rough grouping is carried out using block labeling. This grouping can identify pixels related to image elements where the pixels are not necessarily consecutively connected. The pixels 5 for grouping are ON (that have the value "1") that are similar to the above. For rough grouping also, when identifying the pixels 5 disposed in two dimensions, instead of processing the pixels 5 one by one, four pixels 5 that are adjacent above, below, left, and right are first processed as a single unit, that is, as a pixel block 2. In addition, in the rough grouping, if at least one of the pixels 5 included in the pixel block 2 is ON (that is, the value is "1"), the pixel block 2 is treated as if state of block is ON, and if both pixel blocks 2 that are adjacent, include at least one on-pixel (pixel 5 that is on) respectively, the common identification information (the same identifier, ID, or label value) is assigned to all on-pixels in such pixel blocks 2.

The pixels 5 included in the pixel block 2 are adjacent to one another in two dimensions. This means that if any out of the plurality of pixels 5 included in one pixel block 2 is "1", there is no need to carry out a logic operation for the positional relationships between such pixels. The "1" pixels 5 that are included in the pixel block 2 are consecutively connected, and are definitely assigned the same identifier. In addition, if at least one "1" pixel 5 is included in the pixel block 2, the pixel block 2 is treated as ON. When both pixel blocks 2 adjacent or adjoining each other are ON, all of such pixels 5 included in such pixel blocks 2 are assigned the same identifier. Accordingly, by merely calculating the positional relationship of the pixel blocks 2, grouping all of the pixels included in the pixel blocks 2 can be performed without calculating the positional relationships of the individual pixels 5 included in the pixel blocks 2. This means that a larger number of pixels can be labeled in parallel and that less processing time is spent labeling.

In the rough grouping shown in FIGS. 5 and 6, four pixel blocks 2 that are adjacent above, below, left, and right are labeled in parallel as one large pixel block 3, that is, the large pixel blocks 3 are the pixel processing units for generating a labeled image. The large pixel block 3 includes four (i.e., 2×2) pixel blocks 2 that are adjacent to each other in two dimensions. Accordingly, if any of the plurality of pixel blocks 2 included in one large pixel block 3 is ON, further logic operations do not need to be carried out. These pixel blocks 2 should be ON and such pixels 5 included in such pixel blocks 2 are labeled with the same identifier. By carrying out a grouping process with the large pixel block 3 as a unit, it is possible to process 2×2×4=16 pixels 5 in parallel without a process for logic operations on the relationships between such sixteen pixels 5.

The pixels 5 included in the large pixel block 3 have a distance-based relationship in that they are within a range of two pixel blocks 2, and can be thought of as being identified as belonging to a group of pixels that are linked by such relationship. Also, it can be understood that, when pixels 5 that are ON are included in a large pixel block 3 and in pixel blocks 2 that are adjacent the large pixel block 3, by labeling such pixels 5 with the same identifier, pixels that have distance-based relationships with a maximum range of three pixel blocks 2 are grouped or segmented.

In the rough grouping, the direction of scanning that has the large pixel blocks 3 as units can be any of up, down, left and right. In the present embodiment, as described above, a search is carried out with the left to right direction (Y direction) for the image 1 shown in FIG. 5 as the scanning direction and the top to bottom direction (X direction) as the subscanning direction. Accordingly, the adjacent pixel group 4 for which the relationship with one large pixel block 3 is to be determined is composed of six pixel blocks 2 that are adjoining or adjacent the upper edge and to the left edge of the large pixel block 3.

FIGS. 6(a) and 6(b) show the composition of the pixel blocks 2 included in the large pixel block 3 and the adjacent pixel group 4. In such block labeling, the large pixel block 3 is composed of pixel blocks BL5, BL6, BL8, and BL9 (hereinafter the individual pixel blocks 2 are shown as "BL") and the provisional identifiers PID5, PID6, PID8, and PID9 of the respective pixel blocks are the same. The provisional identifiers PID0 to PID4 and PID7 respectively assigned to the six small pixel blocks BL0 to BL4 and BL7 included in the adjacent pixel group 4 (the group of adjacent pixel block) are referred to when deciding the provisional identifier commonly assigned to the four pixel blocks 2 included in the large pixel block 3. The process for labeling process with provisional identifiers is repeated while scanning the entire image 1 in units of large pixel blocks 3. To label the sixteen pixels Pi0 to Pi15 included in the large pixel block 3 with a provisional identifier, data of forty pixels in a range of columns Co0 to Co7 of the lines Li0 to Li5, including the adjacent pixel group 4, are inputted in parallel and the sixteen pixels Pi0 to Pi15 are labeled with a provisional identifier in parallel, thereby generating a labeled image that has pixels labeled with provisional identifiers.

FIGS. 7(a) to 7(d) show an algorithm that carries out labeling based on the ON/OFF states of the pixel blocks 2 in the adjacent pixel group 4 and the ON/OFF states of the pixel blocks 2 in the large pixel block 3 so that the large pixel block 3 inherits a provisional identifier included in the adjacent pixel group 4 or is assigned a new provisional identifier. In FIG. 7(a), all of the pixel blocks 2 included in the large pixel block 3 are "0". That is, the large pixel block 3 does not include any pixels 5 that are ON and subjects for grouping, and therefore the labeling process that assigns a provisional identifier is not carried out (NOP).

In FIG. 7(b), all of the pixel blocks 2 included in the adjacent pixel group 4 are zero and on-pixels are included in the large pixel block 3. In this case, the adjacent pixel group 4 does not include any ON pixels 5 that are subject for grouping and there are no inheritable provisional identifiers. For this reason, a new provisional identifier is assigned to all of such pixels 5 of the pixel blocks 2 included in the large pixel block 3. That is, the pixels 5 that are ON included in the large pixel block 3 are commonly labeled with a new provisional identifier.

In FIG. 7(c), pixel blocks 2 that are ON but are not adjacent are included in the adjacent pixel group 4 and on-pixels are included in the large pixel block 3. In the adjacent pixel group 4, there is the possibility that pixels have been labeled with different provisional identifiers in pixel block 2 units. Accordingly, the pixel blocks 2 in the large pixel block 3 inherit one of the plurality of provisional identifiers present in the adjacent pixel group 4 by labeling such pixels 5 in the large pixel block 3 with the inherited provisional identifier. In addition, it is determined that such pixel blocks 2 of the adjacent pixel group 4 are included in the same group via the large pixel block 3. Accordingly, when a new connecting relationship is known for the provisional identifiers of such pixel blocks 2 in the adjacent pixel group 4, connecting information of the provisional identifiers that are in connecting relationship is output.

In FIG. 7(d), pixel blocks 2 that are ON and are also adjacent are included in the adjacent pixel group 4 and on-pixels are included in the large pixel block 3. Accordingly, the provisional identifier of the adjacent pixel group 4 is commonly assigned to such pixels 5 of the pixel blocks 2 in the large pixel block 3. Since adjacent pixel blocks 2 that are ON are present in the adjacent pixel group 4, the same provisional identifier will have already been assigned to such pixel blocks 2, and a new connecting relationship will not produced.

With the algorithm shown in FIG. 7, even if pixel blocks 2 are not adjacent, by way of the large pixel blocks 3, such pixel blocks 2 can be assigned the same provisional identifier to group such blocks together as belonging to the same group. Accordingly, the same provisional identifier is assigned to such pixels 5 included in a range of a maximum of three small pixel blocks 2. In place of the algorithm shown in FIG. 7, it is possible to use an algorithm that assigns the same provisional identifier to only pixel blocks 2 that are completely adjacent or adjoining each other. Such algorithm is the similar as that described above with reference to FIGS. 3 and 4, and assigns the same provisional identifier to such pixels 5 included in a maximum range of two pixel blocks 2.

In the algorithm shown in FIG. 7, the condition of a large pixel block 3 is only whether a pixel 5 that is ON is included in the large pixel block 3. Accordingly, determining the state of the large pixel block 3 by calculating a logical OR for the sixteen pixels 5 included in the large pixel block 3 is effective. The states of the adjacent pixel group 4 depend on the pixel blocks 2 that are ON and included in the adjacent pixel group 4, and the states of the individual pixel blocks 2 can be determined by calculating a logical OR for the four pixels 5 included in each pixel block 2. Accordingly, by using hardware with sufficient performance or functioning to calculate a logical OR for a plurality of pixel data in parallel, it is possible to carry out the labeling with provisional identifiers by pipeline processing.

In this way, block labeling is also effective for roughly grouping a large number of pixels that compose an image. If the process for grouping or segmenting consecutively connected pixels is called labeling or fine grain labeling, the process described above can be called rough labeling (or coarse grain labeling). For rough labeling, the same identifier (label) is assigned even if pixels are some distance apart, namely such pixels do not need to be strictly adjoining, thereby making it possible to identify elements composed by such pixels in an image. This means that low pass filtering that is a former process and a connecting process that is a latter process are executed at the same time as the labeling process. By carrying out rough labeling, the size of the block to be processed is increased and the process that assigns provisional labels can be accelerated. Since the number of provisional labels falls, number of provisional labels to be combined is also reduced, generating a merging table by sorting the connecting relationships is accelerated, and the process of assigning real labels is also accelerated.

Accordingly, for a high-resolution image, grouping becomes possible that groups pixels that are included in a high-resolution image at high speed without having to convert the image to a low-resolution image. Providing software and an image processing apparatus becomes possible that can identify boundaries and the like of an image at high speed, and in addition, since the resolution of the image can be maintained for rough process, it is possible to obtain characteristic values of image elements with high precision.

2. Image Processing with Block Labeling

Figure 8:
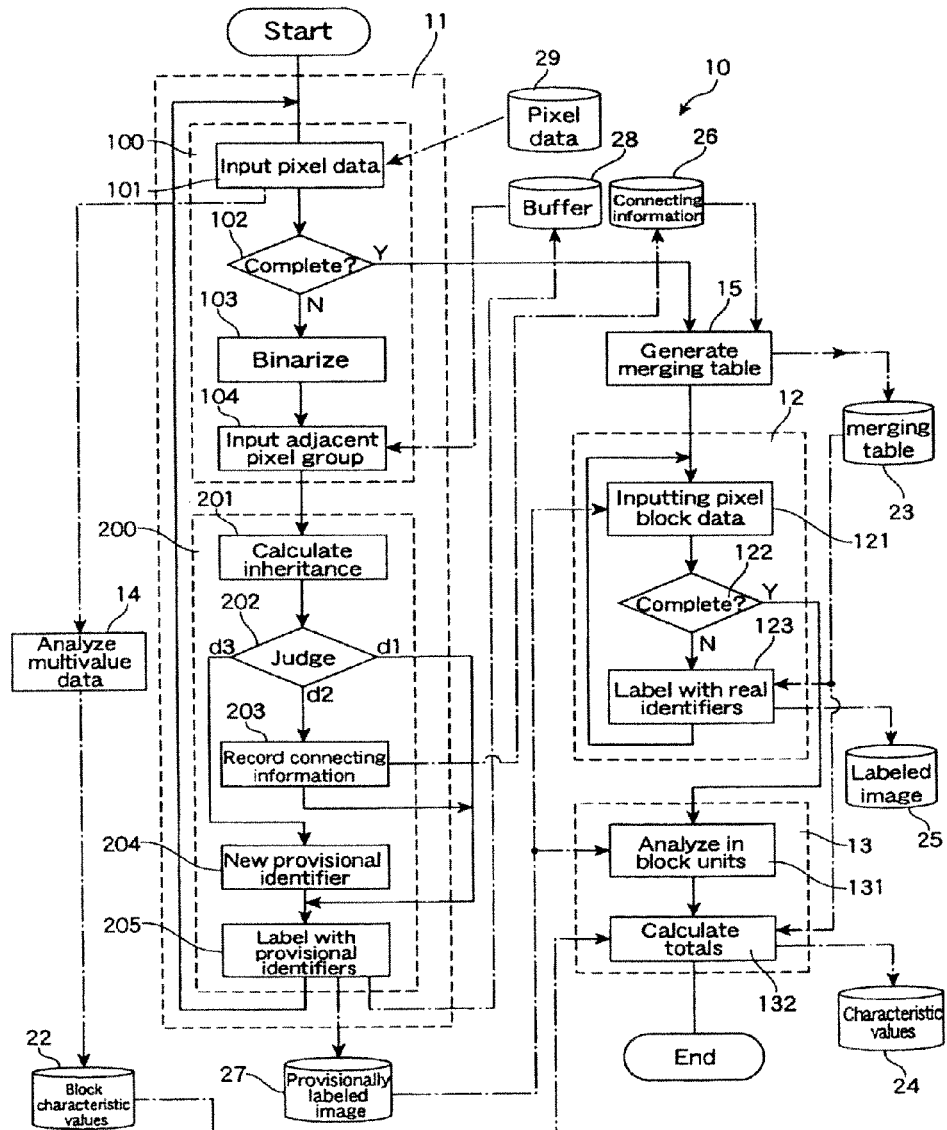
FIG. 8 is a flowchart showing an overview of image processing.

FIG. 8 is a flowchart showing one example of processing that analyzes an image using block labeling. In this flowchart, the principal inputs and outputs of data are shown by dot-dash lines. The image processing 10 generates a labeled image and calculates characteristic values of image elements that have been distinguished from the labeled image. The image processing 10 includes process of generating the labeled image 25, the generating the labeled image including a first stage 11 that scans the image and attaches provisional identification information ("provisional identifiers", "provisional IDs", or "provisional labels") to groups of pixels that compose image elements, and a second stage 12 that relabels the groups of pixels with the same real identification information ("real identifiers", "real IDs", or "real labels") so as to merge the groups of pixels that have been assigned different provisional identifiers but compose the same image elements. As described above, the pixels that are not consecutively connected and are in a predetermined relationship can be grouped by the block labeling as well as the pixels that are consecutively connected. Accordingly, the image elements that can be distinguished in the image processing 10 are not limited to image elements composed of consecutively connected pixels.

The following description will focus on an image processing method that identifies and analyzes image elements composed of pixels that have been roughly grouped using block labeling. The image processing 10 also includes an analysis stage 13 that extracts characteristic values of image elements composed of pixels that have been grouped together. To extract characteristic values not just for binary images but also for images expressed by multivalues or multiple shades (grayscale images), the image processing 10 further includes a process 14 that calculates block characteristic values of pixel blocks composed of multivalue pixels in parallel with the first stage 11 that labeling with provisional identifiers.

The first stage 11 of labeling with provisional identifiers includes the step of inputting 100 that obtains, from the pixel data 29 including pixels that construct the image, sixteen pieces of pixel data included in the large pixel block 3 and twenty-four pieces of pixel data of the adjacent pixel group 4 adjacent to the large pixel block 3 to provide to the step of labeling 200 described below. The step of labeling 200 included in the first stage 11 can label the sixteen pixels 5 included in the large pixel block 3 with the same provisional identifiers.

In the step of inputting 100, in step 101, the data of the pixels 5 included in the large pixel block 3 are inputted from the pixel data file 29. In step 102, if unprocessed data are inputted from the pixel data that constitutes the image 1, in step 103 the multivalue pixel data 5 obtained from the pixel data file 29 are binarized. If the pixel data of the file 29 have already been binarized, this step is unnecessary. Data on the pixels 5 of the adjacent pixel group 4 that have been already labeled with provisional identifiers and temporarily stored in a buffer (buffer memory) 28 and data on the provisional identifiers assigned to such pixels 5 are obtained in step 104.

In the step of labeling 200, in step 201, a logic operation is carried out for judging the conditions or states of the large pixel block 3 and the adjacent pixel group 4 and in step 202, it is determined whether any inheritable provisional identifiers are existed. The algorithm for inheriting provisional identifiers was described above with reference to FIGS. 7(a) to 7(d). When the adjacent pixel group 4 includes only one inheritable provisional identifier (condition d1), in step 205, the provisional identifier is inherited, and the pixels 5 of the large pixel block 3 are labeled with such the same provisional identifier and are outputted in the large pixel block 3 unit to a provisionally labeled image file 27. In addition, information on the provisional identifier included in the adjacent pixel group 4 that will be required in later processing of the large pixel block 3 is temporarily stored in pixel block 2 units in the buffer memory 28 that can be accessed at high speed.

When the adjacent pixel group 4 includes a plurality of provisional identifiers that can be inherited or should be inherited (condition d2), in step 203, connecting information for the plurality of provisional identifiers is recorded. That is, connecting information for the provisional identifier inherited by the pixels 5 of the large pixel block 3 and the other identifiers that are not inherited is outputted to a connecting information file 26. In step 205, the pixels 5 of the large pixel block 3 are labeled with the inherited provisional identifier and are outputted to the provisionally labeled image file 27. When the adjacent pixel group 4 does not include any inheritable provisional identifiers (condition d3), in step 204, a new provisional identifier is generated and in step 205, the pixels 5 of the large pixel block 3 are labeled with the new provisional identifier and are outputted to the provisionally labeled image file 27. By doing so, a provisionally labeled image in which the pixels that constitute the input image have been labeled with provisional identifiers is generated.

In the first stage 11 of labeling using the provisional identifiers, in the step of inputting 100, data on forty pixels Pi included in the large pixel block 3 and the adjacent pixel group 4 are read in parallel. Next, in the step of labeling 200, processes of labeling, with provisional identifiers, the pixels to be grouped (in the present embodiment, pixels that are ON (i.e., pixels with the value "1")) out of the sixteen pixels Pi included in the large pixel block 3 are carried out in parallel. The step of inputting 100 and the step of labeling 200 can be implemented on hardware as a series of processes and executed by pipeline processing. In addition, in the step of labeling 200, the step 201 that decodes and operates the inputted forty pixels Pi to judge inheritance and the step 205 that labels the pixels with the provisional identifiers decided by the step 201 can be implemented on hardware so that such steps are executed by pipeline processing. Accordingly, the processing of the first stage 11 that labels the sixteen pixels 5 included in the large pixel block 3 with provisional identifiers can be executed in effectively one clock cycle.

The step 203 that records the connecting information and the step 204 that selects a new provisional identifier also use the result of decoding the large pixel block 3 and the adjacent pixel group 4. The processing of steps 203 and 204 can be implemented on hardware as included in the first stage 11 and the processing is executed in parallel with the processing of the step 201 that operate an inheritance and of the step 205 of labeling. Including these steps, the processing of the first stage 11 is executed without breakdown and/or delays in the pipeline for reading and labeling sixteen pixels.

In the image processing 10, in the analyzing process 14 carried out in parallel to the first stage 11 that assigns the provisional identifiers, the multivalue data of the pixels 5 included in the large pixel block 3 under the labeling with the provisional identifiers is analyzed and gray level information is calculated in parts corresponding to the large pixel blocks 3. By the process, the gray level information is compressed as block characteristic values (to ¹⁄₁₆ the size in the present embodiment) corresponding to the large pixel blocks 3 and are outputted to a block characteristic value file 22. Since the sixteen pixels 5 included in the large pixel block 3 are labeled with the same provisional identifier, such pixels are later labeled with the same real identifier and constitute the same image element. Accordingly, in process 14, it is effective to find gray-level information, such as maximum and minimum density values, an average value, and other values in advance in large pixel block 3 units from multivalue data (such as "shade data" or "grayscale data") of the sixteen pixels 5 included in the large pixel block 3. After this, by calculating totals in large pixel block 3 units for the block characteristic values, for example the gray level information, based on the connecting information of the provisional identifiers, it is possible to find the gray level information of the respective image elements and to reduce the processing time taken to analyze the gray level information.

In addition, in the first stage 11 of labeling with the provisional identifiers, the pixels 5 included in the large pixel block 3 are inputted from the pixel data file 29. For this reason, by finding the gray level information of the large pixel block 3 in parallel with the first stage 11, it is possible to omit a process that accesses the pixel data file 29 to calculate the gray level information, which also makes it possible to reduce the processing time taken to analyze the gray level information.

When the first stage 11 is completed, in step 15, a merging table 23 is generated from the connecting information stored in the connecting information file 26. In step 203, when pixels 5 that have been labeled with different provisional identifiers are included in the adjacent pixel group 4, pairs of the provisional identifier inherited by the pixels of the large pixel block 3 and the non-inherited provisional identifier(s) are recorded in the connecting information file 26. The inherited provisional identifier and non-inherited provisional identifier(s) are identification information that show the same group (image element). For this reason, in the second stage 12, the pixels 5 that have been labeled with such provisional identifiers are relabeled with an identifier (a real identifier) showing that the pixels 5 ultimately belong to the same group. It is necessary to merge, integrate or combine the inherited provisional identifiers and the non-inherited provisional identifiers, and for this reason, in step 15, the merging table 23 is generated.

In step 15, based on the connecting information file 26 for the provisional identifiers, the same real identifier (real label) is assigned to provisional identifiers that have been assigned to pixels belonging to the same group, and the merging table 23 showing correspondence between the provisional identifiers and the real identifier is generated. With the merging table 23, by using a provisional identifier as an address, for example, the corresponding real identifier can be read. Therefore by referring to the merging table 23 with the provisional identifier as an address, it is possible to convert the provisional identifier to a real identifier. If some provisional identifiers are connected, when extracting image elements composed by pixels connected, such connecting information show that pixels that are labeled with the some provisional identifiers are connected. In the rough grouping, the connecting of a plurality of provisional identifiers does not mean that pixels labeled with the some provisional identifiers are necessarily consecutively connected. However, such pixels are related within a predetermined range.

Next, in the second stage 12, while referring to the merging table 23, the pixel data stored in the provisionally labeled image file 27 are labeled with real identifiers, thereby generating a labeled image (real-labeled data) that is outputted as the labeled image file 25. The provisionally labeled image may also be recorded in bitmap format. By recording in units of pixel blocks 2 with the same provisional identifiers and also in units of large pixel blocks 3, it is possible to reduce the amount of used memory, and in the second stage 12, it becomes easy to read the pixel data in units of large pixel blocks 3. In the second stage 12, in step 121 the pixel data included in the provisionally labeled image file 27 is inputted in parallel in large pixel block 3 units. In step 122, when data not relabeled are inputted from the provisionally labeled image file 27, in step 123, the merging table 23 is referred to and the provisional identifier of the large pixel block 3 is converted to a real identifier, and the pixels 5 included in the large pixel block 3 are labeled with the same real identifier in parallel. Labeled data that has been labeled with the real identifiers to identify independent image elements composed of pixels 5 in a predetermined relationship is generated and outputted to the labeled image file 25. In step 123 of labeling with the real identifiers, pixels for grouping included in a large pixel block 3 are labeled in parallel in large pixel block 3 units with the same real identifier.

In the image processing 10, when the second stage 12 has been completed, the analysis stage 13 is executed. In the analysis stage 13, in step 131, analysis is carried out in large pixel block 3 units and the block characteristic values of the large pixel blocks 3 are calculated. Next, in a step 132, a process that totals the block characteristic values of the large pixel blocks 3 that have the same real identifier is repeatedly carried out to calculate a characteristic value for each image element. Characteristic values that can be calculated from binary pixels or binary data can be calculated in pixel block or large pixel block units from the provisionally labeled image file 27 in which binarized pixels have been labeled with provisional identifiers. Regarding the gray level information, the block characteristic values of large pixel blocks 3 are obtained as described above in stage 14. Accordingly, by calculating a total in step 133, it is possible to calculate characteristic values relating to the gray level of each image element. These characteristic values include information such as area, center of gravity, and height/width dimensions.

In the analysis stage 13, instead of calculating the characteristic values for each image element based on the labeled image 25 that has been labeled with real identifiers, it is possible to refer to the merging table 23 and total the block characteristic values for each image element. Accordingly, if there are sufficient hardware resources, it is possible to configure hardware so that the analysis stage 13 is executed in parallel with the second stage 12.

3. Image Processing System

In the image processing 10 described above, the first stage 11 of labeling with the provisional identifiers and the second stage 12 of labeling with the real identifiers are executed in that order. For the same image, such processes (steps) do not overlap. As described above, the analysis stage 13 may be executed after or in parallel with the second stage 12. For example, after the step 15 of generating the merging table 23 has been completed, the second stage 12 of labeling with the real identifiers and the analysis stage 13 can be carried out in parallel.

The execution timings of the first stage 11 and the second stage 12 do not overlap. This means that by executing the image processing 10 by configuring a circuit for executing the first stage 11 and then a circuit for executing the second stage 12 on reconfigurable hardware, efficient use can be made of hardware resources.

The image processing 10 can process a large amount of pixel data in parallel to reduce the processing time. By implementing the image processing 10 in a processor equipped with a processing region that includes a plurality of processing elements and in which a plurality of data paths that operate in parallel are configured by the plurality of processing elements, it is possible to make the most of the characteristics of the image processing 10 and thereby reduce the processing time. The processing elements should preferably include a certain level of arithmetic logic processing and should preferably be included in a reconfigurable integrated circuit device.

Figure 9:
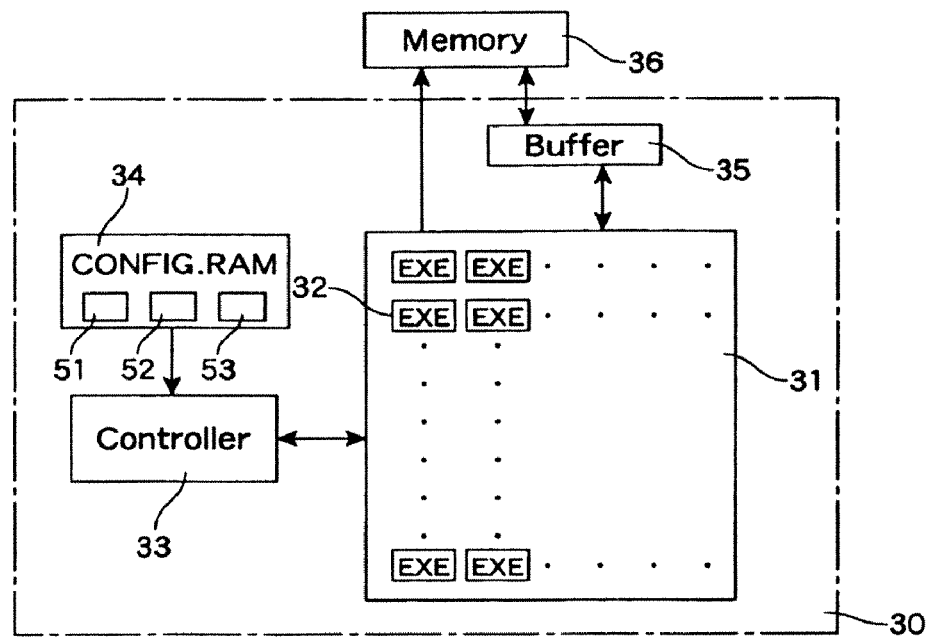
FIG. 9 schematically shows the construction of a reconfigurable processing device suited to image processing.

A processing device 30 shown in FIG. 9 is one example of reconfigurable hardware and includes a region where circuits can be dynamically reconfigured. The processing device 30 includes a matrix region (processing region) 31 in which processing elements (hereinafter referred to as "EXE") 32 equipped with a certain level of arithmetic logic processing, such as an ALU, are connected to configure various data paths. The processing device 30 also includes a controller 33 that controls connections between the EXEs 32 of the matrix 31 to dynamically configure data paths, a RAM 34 in which hardware information (configuration information) of the data paths to be configured in the matrix 31 is recorded, and a buffer 35 in which data to be processed by the circuits of the matrix 31 is temporarily recorded. The processing device 30 also includes an interface for inputting and outputting data into and out of an external memory 36.

The processing device configures data paths that operate in parallel by connecting a plurality of EXEs 32 and it is a hardware resource that is suited to the image processing 10, i.e., to processing a plurality of pixel data in parallel. By reconfiguring the connections of the EXEs 32 of the matrix region (hereinafter, simply "matrix") 31 of the processing device 30 so as to execute the stages 11 to 13 of the image processing 10 in order, it is possible to use the matrix region as a dedicated processing system for executing the image processing 10. An image processing system 50 that executes the image processing 10 using the processing device 30 is described below. Note that, in the processing device 30, it is possible to execute not only image processing relating to labeling but also other processing simultaneously if the hardware resources such as the EXEs 32 of the matrix 31 are sufficient to such multi processing.

Figure 10:
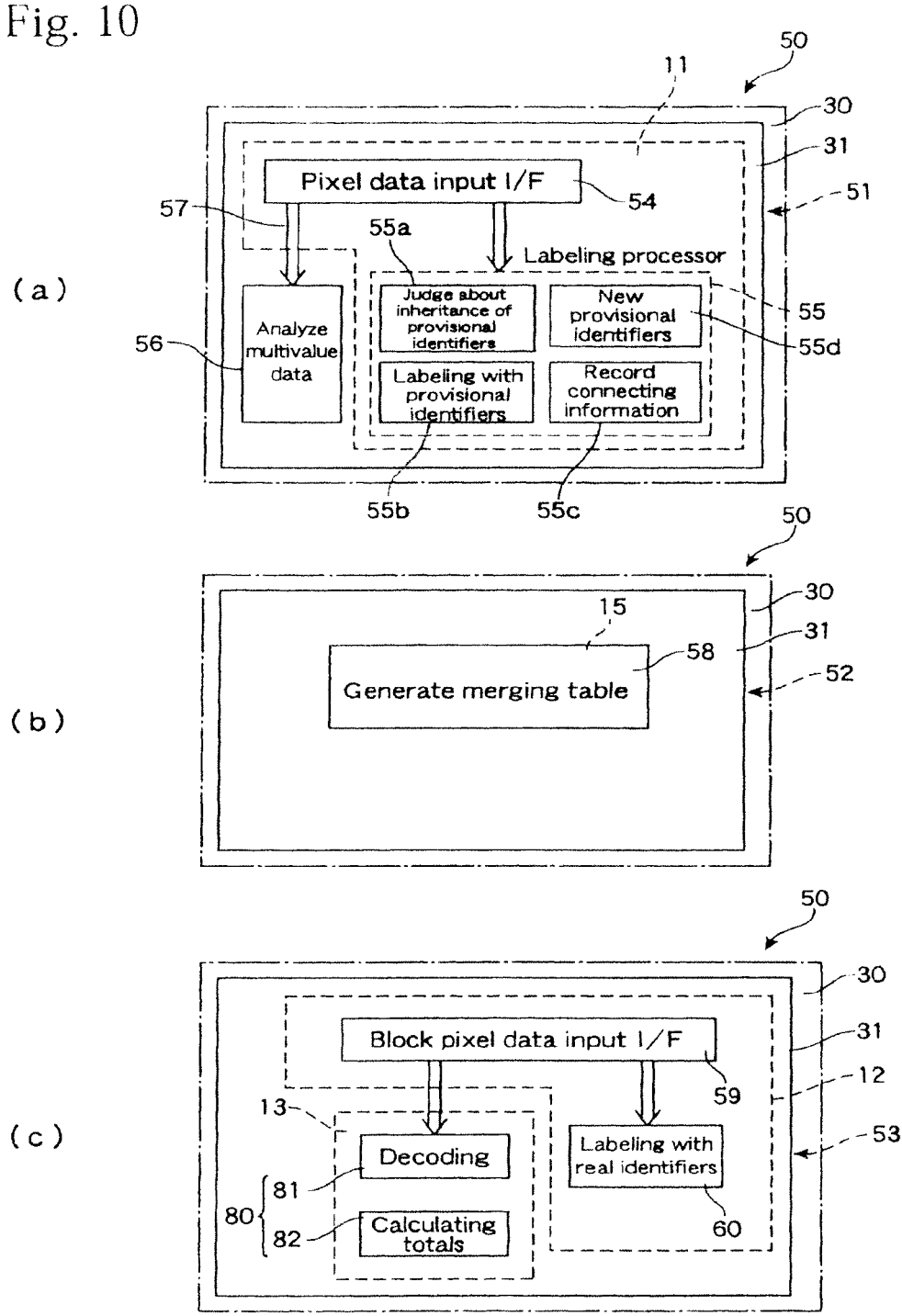
FIGS. 10(a) to 10(c) show the configuration of an image processing apparatus that uses the reconfigurable processing device.

FIGS. 10(a) to (c) show how the matrix 31 that is the processing region is 30 reconfigured so that the processing device 30 functions for the image processing system 50. To have the processing device 30 function for the image processing system 50, in this example three types of configuration information 51 to 53 are prepared in advance and stored in the configuration RAM 34 of the processing device 30. The configuration of the matrix 31 is changed at appropriate timing by the controller 33 to execute the image processing 10. FIG. 10(a) shows the matrix 31 having been reconfigured according to the first configuration information 51 so as to execute in parallel the first stage 11 and the process 14 where multivalue image data is analyzed in large pixel block 3 units. FIG. 10(b) shows the matrix 31 having been reconfigured according to the second configuration information 52 so as to execute the process that generates the merging table. FIG. 10(c) shows the matrix 31 having been reconfigured according to the third configuration information 53 so as to execute the second stage 12 and the analysis stage 13 in parallel.

As shown in FIG. 10(a), by the first configuration information 51, an interface 54 and a labeling processor (labeling engine) 55 are configured in the matrix region 31 of the processing device 30, the interface 54 including a configuration for executing the step of inputting 100 of the first stage 11 and the labeling engine 55 including a configuration for executing the step of labeling 200. In addition, an analysis processor (analysis engine or second processor) 56 including a configuration for executing the process 14 that analyzes multivalue pixel data and a peripheral circuit 57 including a circuit for supplying data from the interface 54 to the labeling processor 55 and the analysis processor 56 are configured in the matrix region 31 by the first configuration information 51. The interface 54 includes a function for inputting the pixel data included in the large pixel block 3 in parallel and a function for inputting data on the provisional identifiers of the adjacent pixel group 4. The labeling processor 55 includes a function 55a that calculates and determines inheritance of provisional identifiers, a function 55b that labels using the provisional identifiers, a function 55c that outputs the connecting information on the inherited provisional identifier and the non-inherited provisional identifiers, and a function 55d for generating a new provisional identifier. The function 55b for labeling with the provisional identifiers assigns an inherited provisional identifier or a new provisional identifier as the same or common provisional identifier in parallel to all of the ON pixels 5 that are subjects for grouping and are included in the large pixel block 3.

Figure 11:
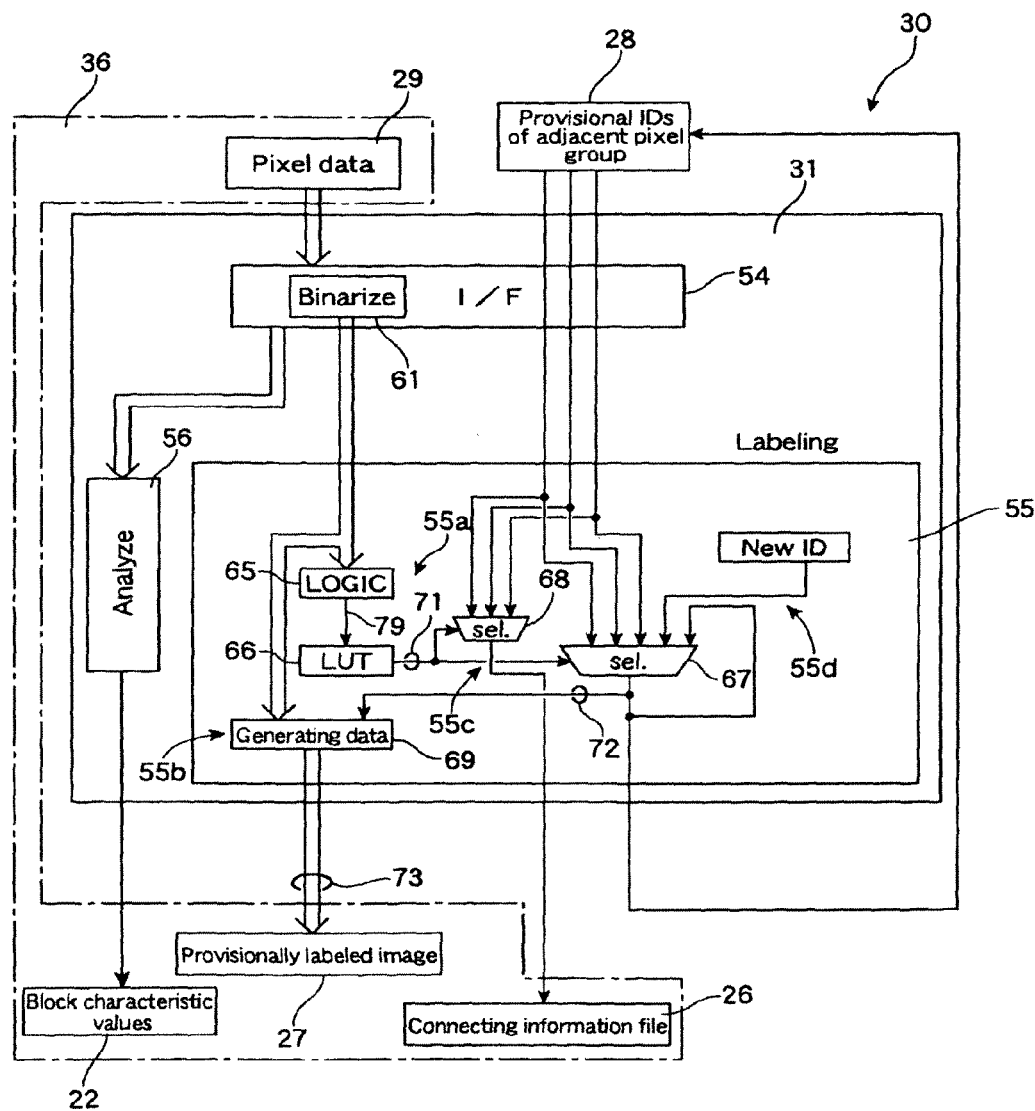
FIG. 11 schematically shows the configuration of an interface and a labeling processor of a first stage for labeling with provisional identifiers.

FIG. 11 shows an overview of the circuits configured in the matrix 31 by the first configuration information 51 in more detail. The interface 54 loads the pixel data included in the large pixel block 3 from the pixel data file 29 in the external memory 36, binarizes the pixel data using a binarizing circuit 61, and supplies the binarized data to the labeling processor 55. At the same time, the multivalue pixel data is supplied to the analysis processor 56. The provisional identifiers (provisional IDs) of the adjacent pixel group 4 are obtained from the buffer 28 and supplied to the labeling processor 55. The labeling processor 55 is equipped with a logic circuit 65 that calculates a logical OR for data supplied from the interface 54, a lookup table (LUT) 66 that determines from the results of the logical OR whether there are any provisional IDs to be inherited, a selector 67 that selects a provisional ID, and a selector 68 that selects connecting information.

The logic circuit 65 generates an address 79 including ten values by carrying out logical OR operations on a total of ten pixel blocks 2 (BL0 to BL9 in FIG. 6) corresponding to a large pixel block 3 and the adjacent pixel blocks 4. The LUT 66 uses this value 79 as an address input and outputs a microcode stored at that address as an ID control signal 71. Various logic circuits such as the selectors 67 and 68 are controlled using this microcode 71.

The data generating circuit 69 can labels the sixteen pixels 5 included in the large pixel block 3 in parallel with a provisional ID. In this example, the data generating circuit 69 gathers sixteen pieces of binary pixel data supplied from the interface circuit 54 and the selected provisional ID 72 to output the one word (32 bits) of block pixel data 73. That is, the block pixel data 73 includes an ID 73d and pixel data 73p for sixteen pixels. The labeling of the sixteen pixel data included in the large pixel block 3 is collectively carried out in parallel as one word of data. The provisionally labeled image data outputted to the provisionally labeled image file 27 is composed of such block pixel data 73.

Figure 12:
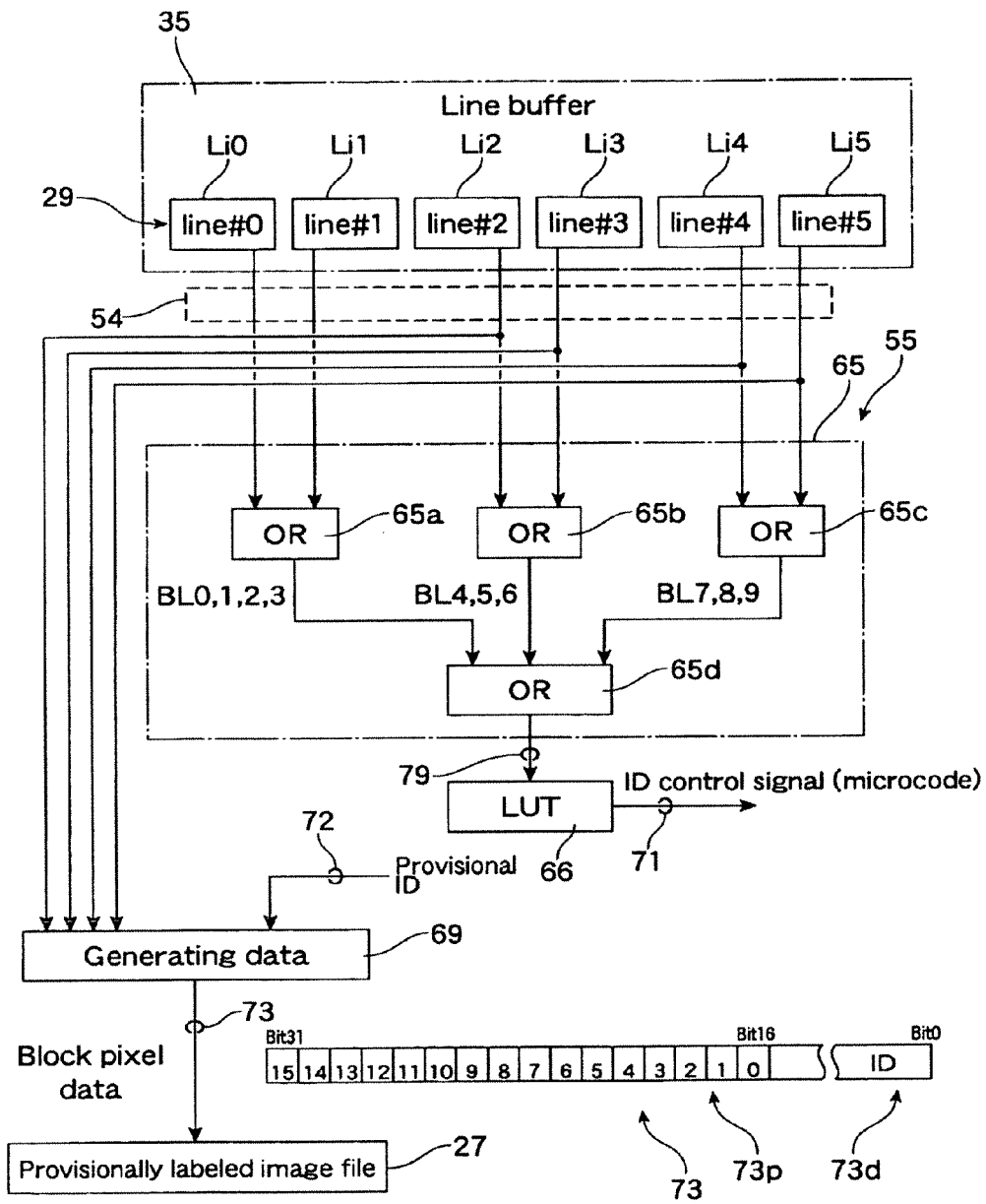
FIG. 12 schematically shows the configuration of a logic part of the labeling processor shown in FIG. 11.

FIG. 12 shows an overall circuit configuration in the labeling processor 55 for generating and outputting block pixel data 73 from the supplied pixel data. First, the interface 54 uses a shift register and mask circuit to cut out the pixel data included in the large pixel block 3 and the adjacent pixel group 4 (the group of adjacent pixel blocks) from the pixel data 29 that has been stored from the external memory 36 in a line buffer 35. As one example, pixel data of the lines Li0 to Li5 and columns Co0 to Co7 shown in FIGS. 5 and 6 is loaded. If sufficient bus width can be reserved, 40 bits of pixel data for 40 dots can be read out in one clock (cycle).

The logic circuit 65 of the labeling processor 55 calculates a logical OR for the pixel data 5 of the 0th line Li0 and the first line Li1 using an OR circuit 65a and judges whether the blocks BL0 to BL3 are ON, that is, whether the respective blocks include at least one on-pixel. In the same way, a logical OR is calculated for the pixel data 5 of the 2nd line Li2 and the 3rd line Li3 using an OR circuit 65b to judge whether the blocks BL4 to BL6 are ON. A logical OR is also calculated for the pixel data 5 of the 4th line Li4 and the 5th line Li5 using an OR circuit 65c to judge whether the blocks BL7 to BL9 are ON.

The states of the adjacent pixel group 4 and the large pixel block 3 can be determined from the calculation results of the OR circuits 65a, 65b, and 65c. To do so, a logical OR is also calculated on the outputs of the OR circuits 65a, 65b, and 65c by the OR circuit 65d to generate a logical OR result for the ten pixel blocks BL0 to BL9 as a 10-bit address input 79 which is supplied to the LUT 66. By the address, a suitable microcode is outputted from the LUT 66 as the ID control signal 71. The LUT 66 can be realized using RAM elements provided in advance in the matrix region 31.

The circuit having such configuration performs a series of processes that loads the pixels 5, calculates logical ORs in order and outputs the ID control signal 71 sequentially with no backtracking. Accordingly, by configuring data paths for many parallel processes using the large number of elements 32 disposed in the reconfigurable matrix 31, processes on pixel data related to one or a plurality of large pixel blocks 3 can be carried out in parallel and such processes becomes subjected to be pipeline processing. The provisional IDs for at least one large pixel block 3, that is, at least sixteen pixels can be determined in effectively one clock (cycle).

The data generating circuit 69 generates one word (i.e., 32 bits) of block pixel data 73, which includes information on the sixteen pixels included in one large pixel block 3 and provisional ID information that has been commonly assigned to the sixteen pixels, and outputs the block pixel data 73 to the provisionally labeled image file 27 as provisionally labeled image data. In this block pixel data 73, it is possible to also include position information of the large pixel block 3, a characteristic value of the large pixel block 3 that has been calculated from information on sixteen pixels, and the like.

To generate the block pixel data 73, it is necessary to supply the data generating circuit 69 with the data of the sixteen pixels included in the large pixel block 3 and data 72 on the provisional ID assigned to such pixels. To supply the data 72 on the provisional ID of the large pixel block 3 to the data generating circuit 69 according to the ID control signal 71 of the LUT 66, a certain amount of calculation time is required following the input of the pixel data of the large pixel block 3. By supplying the data of the sixteen pixels loaded by the input interface 54 to the data generating circuit 69 via a suitable delay circuit or a pipeline register, the data can be supplied to the data generating circuit 69 in synchronization with the data 72 on the provisional ID of the large pixel block 3. Accordingly, in the labeling processor 55, after the pixel data of the large pixel block 3 has been loaded from the line buffer 35, the processing as far as the labeling the pixel data with a provisional ID can be carried out by pipeline processing.

This means that in the image processing system 50, the provisional ID is decided for at least one large pixel block 3, that is, at least sixteen pixels and provisionally labeled image data that has been labeled with such provisional ID can be outputted in effectively one clock cycle. Accordingly, the image processing system 50 can group at least sixteen pixels in one cycle, and compared to a process that carries out grouping in single pixel units, image processing can be carried out over ten times faster. Also, pixel data 73p of the original resolution is stored in the grouped block pixel data 73, and therefore there is no fall in the resolution of the analyzed image.

Figure 13:
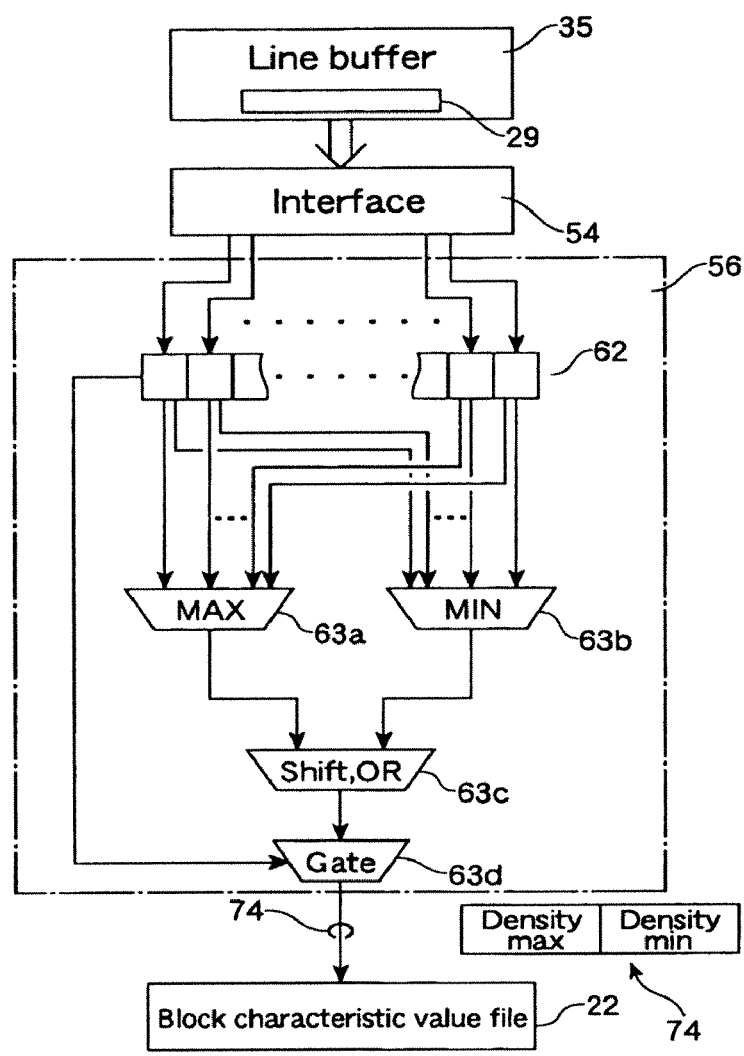
FIG. 13 schematically shows the configuration of a processor (a second processor) that analyzes gray levels.

FIG. 13 shows the overall configuration of a processor 56 that extracts characteristic values in large pixel block 3 units. To the analysis processor 56, the interface 54 supplies the original data, that is, grayscale (multivalue) pixel data for sixteen pixels included in one large pixel block 3 cut out from the line buffer 35. Processing units 62 having threshold values judges whether the respective pixel data are to be compared for setting a maximum or minimum of the gray level. The selectors 63a and 63b respectively select (calculate) a maximum value and a minimum value for the data on the sixteen pixels that have been processed with the threshold and the results of such calculations are packed into one word of gray level data 74 by a shift/OR circuit 63c. If there is no error for the calculation of the maximum value and minimum value, the gray level data 74 passes a gate circuit 63d and is outputted to the block characteristic value file 22.

Figure 14:
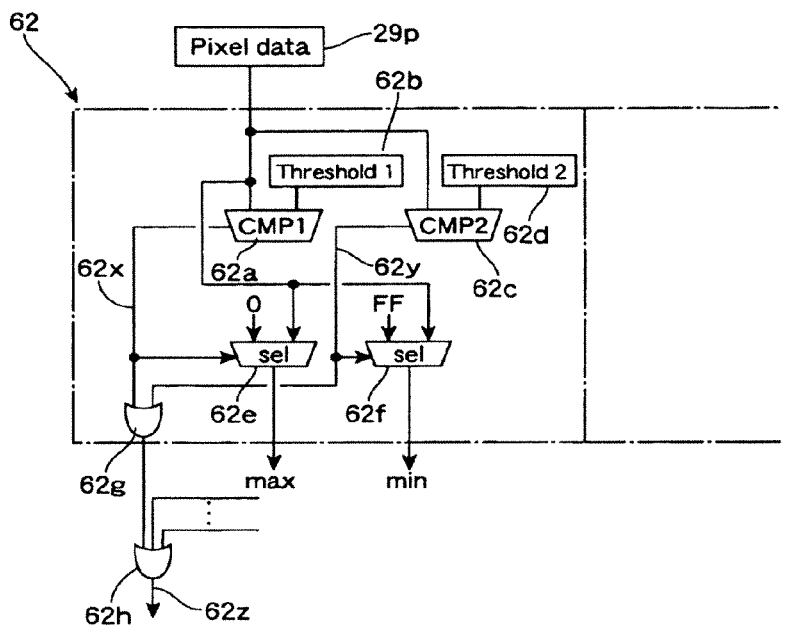
FIG. 14 schematically shows the configuration of a threshold unit of the processor shown in FIG. 13.

FIG. 14 shows a circuit configuration in the processing unit 62 having threshold values for carrying out an operation on one pixel with the threshold values. Pixel data 29p for one pixel is compared with a first threshold 62b by a comparator 62a and the pixel data 29p is judged to be significant if the pixel data 29p is larger than the first threshold 62b. As a result, a carry 62x is asserted and the pixel data 29p is outputted by the selector 62e as data to be compared with the maximum value. When the pixel data 29p falls below the first threshold 62b, "0" is outputted from the selector 62e and the pixel data 29p is ignored as a maximum value. The pixel data 29p is also compared with a second threshold 62d by a comparator 62c and is judged to be significant if the pixel data 29p is smaller than the second threshold 62d. As a result, a carry 62y is asserted and the pixel data 29p is outputted by the selector 62f as data to be compared with the minimum value. When the pixel data 29p is above the second threshold 62b, "FF" is outputted from the selector 62f and the pixel data 29p is ignored as a minimum value. A logical OR is calculated by a circuit 62g for the carries 62x and 62y that show the comparison results and a logical OR that includes the comparison results for other pixels is calculated by a circuit 62h.

If, as a result, one of the pixel data 29p is outside the range of the first threshold value 62b and the second threshold value 62d, such pixel data 29p is outputted as significant gray level information. On of examples of this process is determining whether defects are present, and if the gray level data for all pixels is within the range of the first threshold value 62b and the second threshold value 62d, it is determined that there are no defects in the range of the large pixel block 3 being analyzed and gray level information is not outputted.

Figure 15:
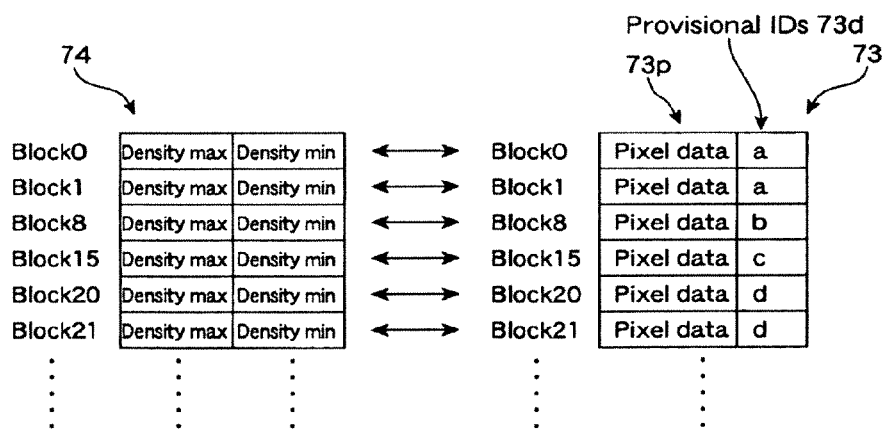
FIG. 15 schematically shows gray level data.

In the same way as the labeling processor 55, the analysis processor 56 outputs the gray level information 74 in units of large pixel blocks 3. As shown in FIG. 15, the block characteristic data 74 that is gray level information in block units one-to-one corresponds to the block pixel data 73. Accordingly, by calculating totals based on the provisional identifiers (provisional IDs) and the merging table 23 at a lager stage, it is possible to obtain characteristic values (gray level information) for each image element.

At a time after the first stage 11 has been completed, as shown in FIG. 10(b), the matrix 31 is reconfigured using the second configuration information 52 so as to generate the merging table. The provisional identifiers inherited by the pixels of the large pixel block 3 and the non-inherited provisional identifiers paired with such provisional identifiers are recorded in the connecting information file 26. At the following stage before generating the labeled image, the merging table 23 is generated by assigning the same real identifiers (real IDs) to the pairs of one or a plurality of provisional identifiers in a connecting relationship.

The algorithm that generates the merging table 23 from the connecting information file 26 is as follows. In the connecting information file 26, a plurality of entries that show the connection of two provisional IDs are recorded. In the merging table 23, with a provisional ID as an address, the real label corresponding to the provisional identifier should be obtained.

Step h1: If the provisional IDs in the $n^{th}$ entry in the connecting information file 26 are assumed to be "a" and "b", the $n^{th}$ entry is stored as a group queue.

Step h2: The top entry of the group queue, for example the pair "a" and "b", is stored in a comparison register.

Step h3: The values from the $n^{th}$ value onward are read from the connecting information file 26 and compared with the values "a" and "b" in the comparison 5 register.

Step h4: An entry where at least one value matches with the "a" or "b" is added to the group queue.

Step h5: When the end of the connecting information file 26 is reached, the next entry is read from the group queue, is stored in the comparison register, and the same operation is carried out.

Step h6: When the end of the group queue is reached, all provisional IDs entered in the group queue are assigned the same real identifier.

As described above, information stored in the merging table 23 for one real ID is obtained, thereby completing the group for that real ID. Next, the $n+1^{th}$ entry is read from the connecting information file 26 and the same operation is carried out. However, connecting information that has already been stored in the group queue once is not stored in the group queue again. After the operation described above is completed, if there are provisional IDs that are yet to be assigned real IDs, unique real IDs are respectively assigned to such provisional IDs. By carrying out the operation described above, the merging table 23 is successfully generated. The second configuration information 52 configures data paths for carrying out the algorithm described above in the matrix region 31.

At a time after the merging table 23 has been generated, as shown in FIG. 10(c), the matrix 31 is reconfigured by the third configuration information 53 so as to execute the second stage 12. At that time, the matrix 31 is also configured to execute the analysis stage 13 by the third configuration information 53. To execute the second stage 12, the third configuration information 53 configures an interface 59 that inputs the block pixel data 73 including the provisional IDs 73d and the pixel data 73p from the provisionally labeled image file 27 and a labeling processor (labeling engine) 60 that relabels the provisional IDs with the real IDs. Also, to execute the analysis stage 13, the third configuration information 53 configures an analysis processor 80 (analysis engine or "first processor") that includes a circuit 81 that decodes the block pixel data 73 to calculate characteristic values in large pixel block 3 units and a circuit 82 that totals such characteristic values in block units based on the merging table 23 and thereby calculates a characteristic value for each image element.

Figure 16:
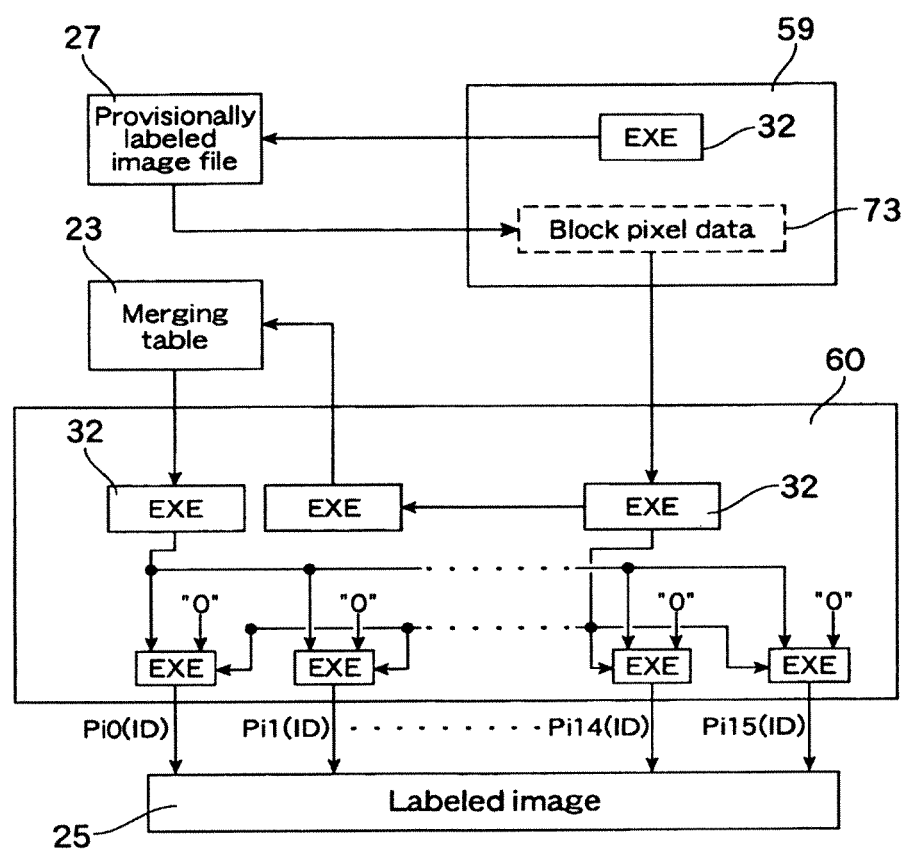
FIG. 16 schematically shows the configuration of an interface and a labeling processor of a second stage for labeling with real identifiers.

FIG. 16 shows an example circuit of the labeling processor 60 that reads the block pixel data 73 and refers to the merging table 23 to label with real identifiers (real IDs or real labels) in large pixel block 3 units. First, the interface circuit 59 accesses the provisionally labeled image file 27 and obtains the block pixel data 73. The block pixel data 73 includes pixel data 73p for sixteen pixels that constitute a large pixel block 3 and such pixel data is inputted in parallel. In the labeling processor 59b for the real identifiers, the merging table 23 is accessed with the provisional ID 73d of the block pixel data 73 as an address to obtain the real ID. Based on the pixel data for sixteen pixels in the block pixel data 73, the elements 32 of the matrix 31 are used as selectors that operate in parallel so that the ON ("1") pixels that are to be grouped together are assigned the real ID, other pixels are set at "0", and the labeled pixels are outputted to the labeled image file 25.

The labeling processor 60 can also output block pixel data produced by rewriting the ID values 73d of the block pixel data 73 from provisional IDs to real IDs as the labeled image data. In this case also, the data 73p of sixteen pixels is collectively labeled in parallel with the same real ID.

Figure 17:
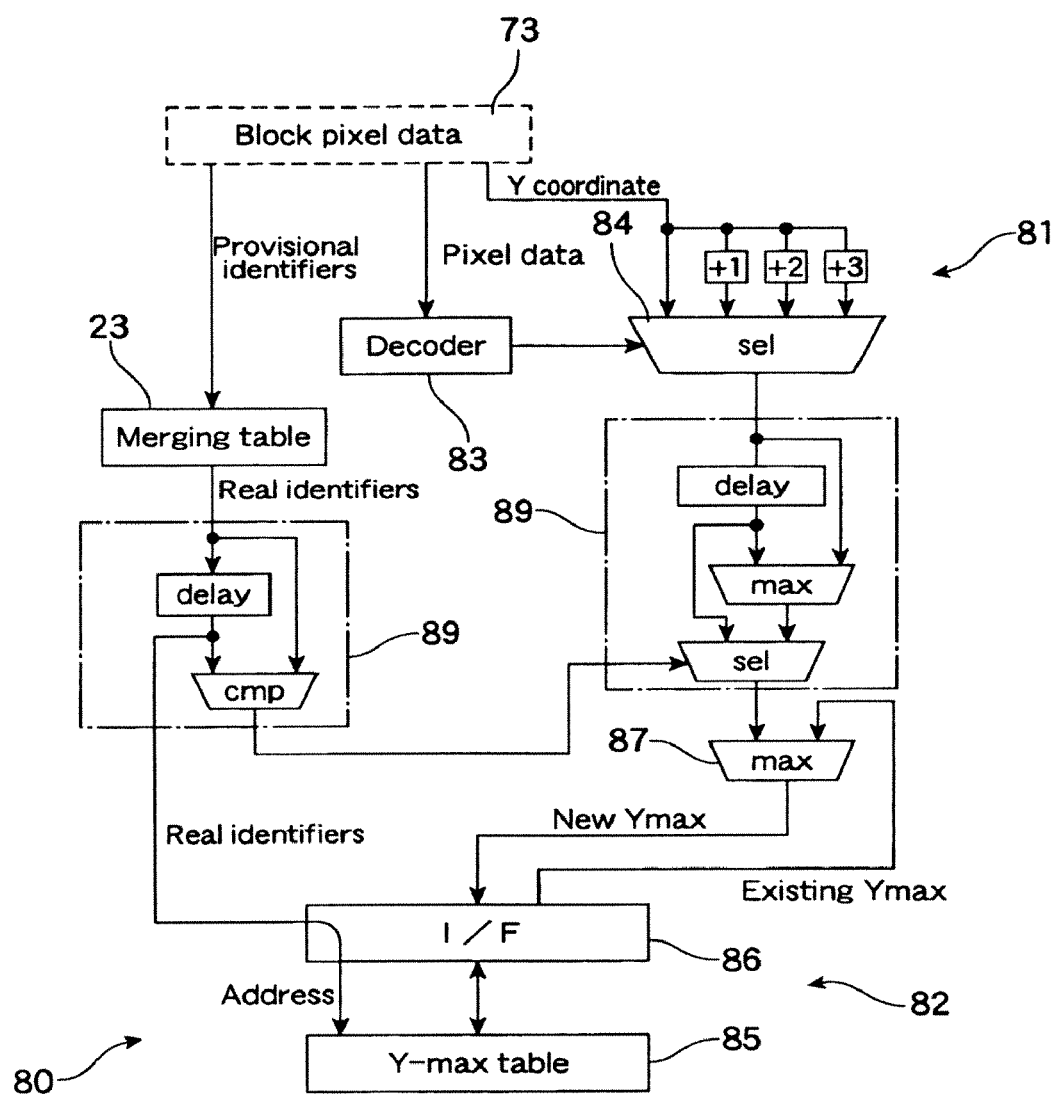
FIG. 17 schematically shows the configuration of an analysis processor (a first processor) that carries out a process for extracting a maximum value in the Y direction.

FIG. 17 shows an example circuit of the analysis processor 80. Logic that finds a maximum value in the Y coordinate direction is implemented in this circuit 80. The circuit 80 includes a first circuit 81 that finds characteristic amounts (maximum values) of the respective large pixel blocks 3 using a decoder and a second circuit 82 that calculates totals of the characteristic amounts using the real IDs and finds maximum values of pixels grouped by the real IDs. The first circuit 81 includes a decoder 83 that converts the data 73p of sixteen pixels in the block pixel data 73 to control data and a selector 84 that finds characteristic values, that is, maximum values in the Y coordinate direction in large pixel block 3 units from the control data. The second circuit 82 includes a Y-Max table I/F 86, which converts the provisional ID 73d of the block pixel data 73 to a real ID using the merging table 23 and accesses the Y-Max table 85 with the real ID as an address, and a selector 87 that selects a maximum value. The selector 87 selects, among the inputs of a Y-coordinate maximum value obtained via the Y-Max table I/F 86 from the table 85 by the real ID and a Y coordinate obtained by the selector 84, the new maximum value. In addition, the selector 87 outputs the new maximum value via the I/F 86 to the Y-Max table 85 to update the maximum value.

By the analysis processor 80, it is possible to find the width in the Y direction of the image element composed of the pixel groups that have been segmented. In the same way, a variety of characteristic amounts such as a minimum value in the Y coordinate direction and the maximum value and minimum value in the X coordinate direction can be found. Since it is possible to calculate the characteristic amounts in units of large pixel blocks 3 that are composed of sixteen pixels, the processing time required to calculate the characteristic amounts can be reduced.

The analysis processor 80 also includes a circuit 89 that reads the following block pixel data 73, compares the real IDs via the merging table 23 and when the real IDs are the same, finds a maximum value by including the following block pixel data 73 before the data is written into the table 85. This circuit 89 can reduce the processing time when block pixel data 73 with the same ID is consecutive. Since the analysis processor 80 carries out a read-modify-write process on the Y-Max table 85, a function for a situation where the same real ID is consecutively inputted is required in order to not increase the latency of the pipeline. In addition to the circuit 89 in FIG. 17, by reading in advance and comparing the following block pixel data 73, it is possible to reduce the latency of the feedback path from five cycles to three cycles.

The image processing method 10 and image processing device 50 described above can group pixels, when such pixels are not strictly adjoining, according to desired rules. A processing method and processing device for labeling pixels consecutively connected are also be provided with substantially the same configuration using the logic for assigning the provisional identifiers described with reference to FIGS. 3 and 4.

In addition, although an example where a two-dimensional binary image is analyzed has been described above, the scope of the present invention is not limited to. Although the small pixel blocks 2 that are the basic units are composed of four pixels that are adjacent to one another, when grouping together pixels that are related in a wider range, the pixel blocks used as basic units may be composed of five or more pixels. Similarly, although the large pixel blocks 3 are composed of four pixel blocks 2 that are adjacent to one another, when grouping together pixels that are related in a wider range, the large pixel block may be composed of five or more pixel blocks 2. Also, the binarization of the pixels is not limited to monochrome images and it is possible to binarize the separate color components of a color image. In addition, the present invention is not limited to processing two-dimensional images and can be applied to block labeling of three-dimensional images and in such case, as described above, the pixel blocks that are the basic units are composed of eight pixels that are adjacent to one another.

The invention claimed is:

1. A method of analyzing an image, including a first stage and a second stage, wherein the first stage includes:

inputting a pixel block, which includes a limited number of pixels that are adjacent to one another in more than one dimension, as a single unit from data including a plurality of pixels for forming an image, together with an adjacent pixel group including pixels that are adjacent to the pixel block and have already been labeled;

labeling, based on binarized pixels, all on-pixels or all off-pixels that are subject for grouping included in a pixel block with common identification information, the common identification information being an inherited identification when the adjacent pixel group includes inheritable identification information and connecting information is recorded when the adjacent pixel group includes other inheritable identification information, or new identification information when the adjacent pixel group does not include inheritable identification information; and calculating block characteristic values of the pixel block, and wherein the second stage includes, calculating characteristic values of respective image elements composed of pixel blocks that have identification information connected by the connecting information with calculating total of the block characteristic values of the pixel blocks that have identification information connected by the connecting information.

2. The method according to claim 1, wherein the block characteristic values include at least one of values including moments, areas, boundary lengths, densities, volumes, centers of gravity, and widths.

3. The method according to claim 1, wherein in the first stage, the step of calculating a block characteristic value is performed in parallel with the step of labeling in units of the pixel blocks under labeling.

4. The method according to claim 3, wherein the step of calculating a block characteristic value includes calculating the block characteristic value based on multivalue pixels included in the pixel block under labeling.

5. The method according to claim 3, wherein in the step of inputting, the pixel block composed of four pixels adjacent to one another in two dimensions or eight pixels adjacent to one another in three dimensions is inputted as a single unit.

6. The method according to claim 3, wherein in the step of inputting, in addition to the pixel block composed of four pixels adjacent to one another in two dimensions, a large pixel block composed of four pixel blocks adjacent to one another in two dimensions is inputted as another single unit, and in the step of labeling, all on-pixels or all off-pixels that are subject for grouping included in the large pixel block are labeled with the common identification information.

7. A sustem including:
an interface configured for inputting data including a plurality of pixels, which are adjacent in more than one dimension and constitute a pixel block, in parallel from data including pixels for forming an image; and
a labeling processor configured for labeling, based on binarized pixels, all on-pixels or all off-pixels that are subject for grouping and are included in the pixel block with common identification information in parallel,
wherein the system further comprises a first processor configured to repeatedly operations of a first stage and a second processor configured to perform an operation of a second stage,
wherein the first stage includes:
inputting a pixel block, which includes a limited number of pixels that are adjacent to one another in more than one dimension, as a single unit from data including a plurality of pixels for forming an image, together with an adjacent pixel group including pixels that are adjacent to the pixel block and have already been labeled;
labeling, based on binarized pixels, all on-pixels or all off-pixels that are subject for grouping included in a pixel block with common identification information, the common identification information being an inherited identification when the adjacent pixel group includes inheritable identification information and connecting information is recorded when the adjacent pixel group includes other inheritable identification information, or new identification information when the adjacent pixel group does not include inheritable identification information; and
calculating block characteristic values of the pixel block, and
wherein the second stage includes,
calculating characteristic values of respective image elements composed of pixel blocks that have identification information connected by the connecting information with calculating total of the block characteristic values of the pixel blocks that have identification information connected by the connecting information.

8. The system according to claim 7, wherein the first processor is configured to perform the inputting for inputting the pixel block composed of four pixels adjacent to one another in two dimensions or eight pixels adjacent to one another in three dimensions as a single unit.

9. The system according to claim 7, wherein the first processor is configured to perform the inputting for inputting, in addition to the pixel block composed of four pixels adjacent to one another in two dimensions, a large pixel block composed of four pixel blocks adjacent to one another in two dimensions as another single unit, and the labeling for labeling all on-pixels or all off-pixels that are subject for grouping included in the large pixel block with the common identification information.

10. The system according to claim 7, wherein the block characteristic values include at least one of values including moments, areas, boundary lengths, densities, volumes, centers of gravity, and widths.

11. The system according to claim 7, wherein the first processor is configured to perform the labeling and the calculating of block characteristic values in parallel.

12. The system according to claim 11, wherein the first processor is configured to perform the calculating of block characteristic values from multivalue pixels included in pixel blocks under labeling.

* * * * *